US010747477B2

(12) United States Patent
Fukumoto

(10) Patent No.: US 10,747,477 B2
(45) Date of Patent: Aug. 18, 2020

(54) PRINT CONTROL SYSTEM THAT TRANSMIT TO A REGISTERED PRINTING APPARATUS, A CHANGE INSTRUCTION FOR CHANGING A SETTING OF THE POWER OF THE REGISTERED PRINTING APPARATUS, AND RELATED METHOD

(71) Applicant: CANON KABUSHIKI KAISHA, Tokyo OT (JP)

(72) Inventor: Takuji Fukumoto, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/184,631

(22) Filed: Nov. 8, 2018

(65) Prior Publication Data
US 2019/0155551 A1    May 23, 2019

(30) Foreign Application Priority Data

Nov. 17, 2017 (JP) .................................. 2017-221997
Aug. 21, 2018 (JP) .................................. 2018-154693

(51) Int. Cl.
*G06F 3/12* (2006.01)
*G10L 15/22* (2006.01)
*G06F 3/16* (2006.01)

(52) U.S. Cl.
CPC .......... *G06F 3/1204* (2013.01); *G06F 3/1231* (2013.01); *G06F 3/1253* (2013.01); *G06F 3/1288* (2013.01); *G06F 3/167* (2013.01); *G10L 15/22* (2013.01); *G10L 2015/223* (2013.01)

(58) Field of Classification Search
CPC .... G06F 3/1204; G06F 3/1231; G06F 3/1253; G06F 3/1288; G06F 3/167; G10L 15/22; G10L 15/223

USPC ..... 358/1.11–1.18, 400–404, 1.9, 2.1; 704/9, 704/235, 260, 275
See application file for complete search history.

(56) References Cited

U.S. PATENT DOCUMENTS

| | | | |
|---|---|---|---|
| 6,295,391 B1* | 9/2001 | Rudd ....................... | G06F 3/16 381/110 |
| 6,386,107 B1* | 5/2002 | Rancourt ............... | B41F 33/00 101/483 |
| 9,271,111 B2 | 2/2016 | Blanksteen | |
| 2006/0176505 A1* | 8/2006 | Burke ............... | H04M 3/42221 358/1.15 |

(Continued)

FOREIGN PATENT DOCUMENTS

| JP | 2006-095984 A | | 4/2006 |
|---|---|---|---|
| JP | 2006095984 A | * | 4/2006 |

(Continued)

*Primary Examiner* — Chad Dickerson
(74) *Attorney, Agent, or Firm* — Venable LLP

(57) ABSTRACT

A print control system including a printing apparatus and a server system. The print control system also includes a processor that executes instructions to receive a registration request of the printing apparatus, to register the printing apparatus based on the received registration request, and to transmit, based on receipt of a setting instruction concerning a setting of power of the printing apparatus by voice for a voice control device, to the registered printing apparatus, a change instruction for changing a setting of power of the registered printing apparatus. In addition, the processor executes the instructions to perform setting processing concerning the setting of power based on the transmitted change instruction.

16 Claims, 18 Drawing Sheets

(56) References Cited

U.S. PATENT DOCUMENTS

| | | | | |
|---|---|---|---|---|
| 2013/0145221 A1* | 6/2013 | Kaneko | ................... | H04L 41/12 |
| | | | | 714/48 |
| 2014/0043630 A1* | 2/2014 | Buser | ..................... | H04N 13/20 |
| | | | | 358/1.13 |
| 2014/0293331 A1* | 10/2014 | Asai | ...................... | G06F 3/1286 |
| | | | | 358/1.15 |

FOREIGN PATENT DOCUMENTS

| | | | |
|---|---|---|---|
| JP | 2016-502192 A | 1/2016 | |
| WO | 2014/092980 A | 6/2014 | |

\* cited by examiner

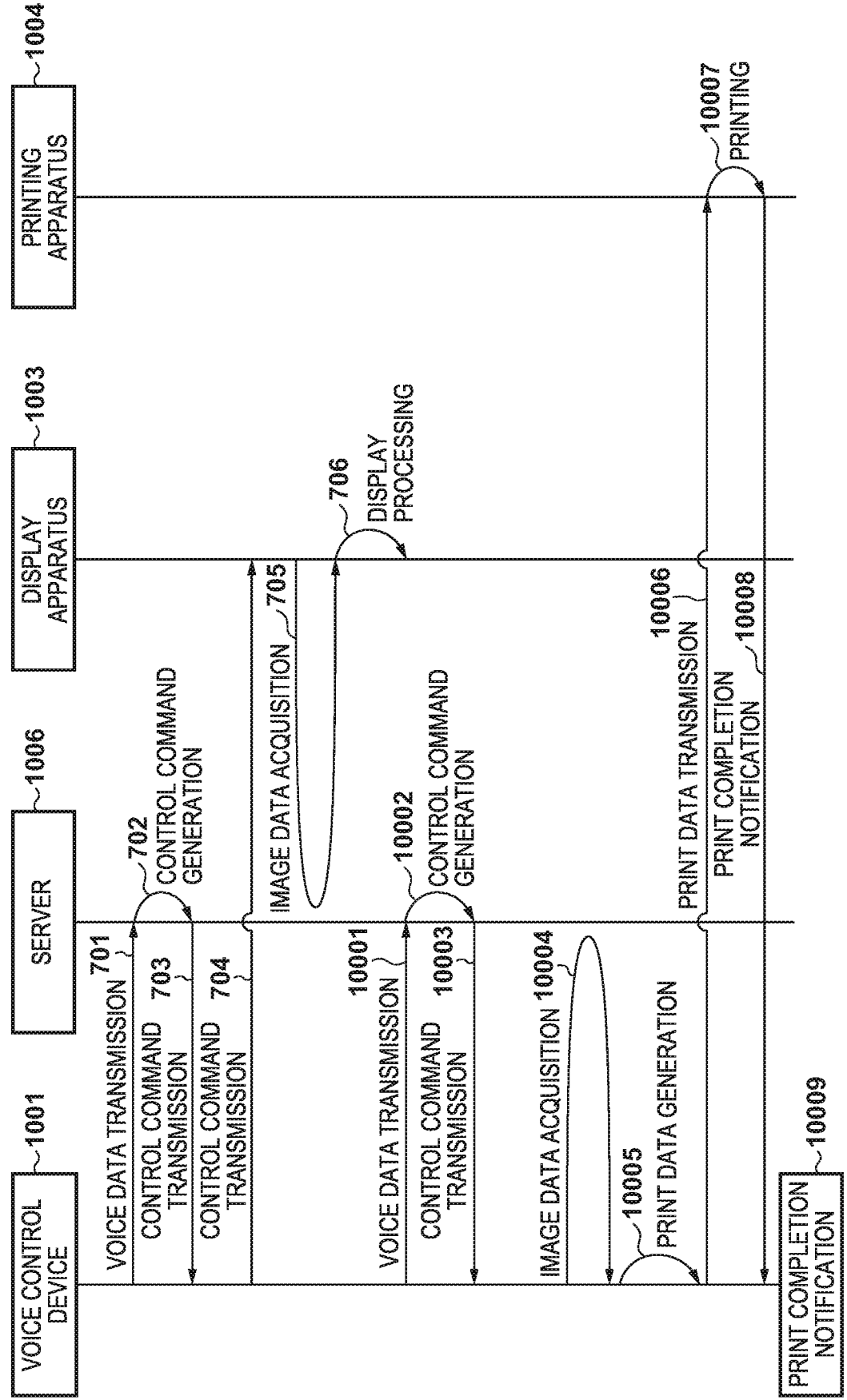

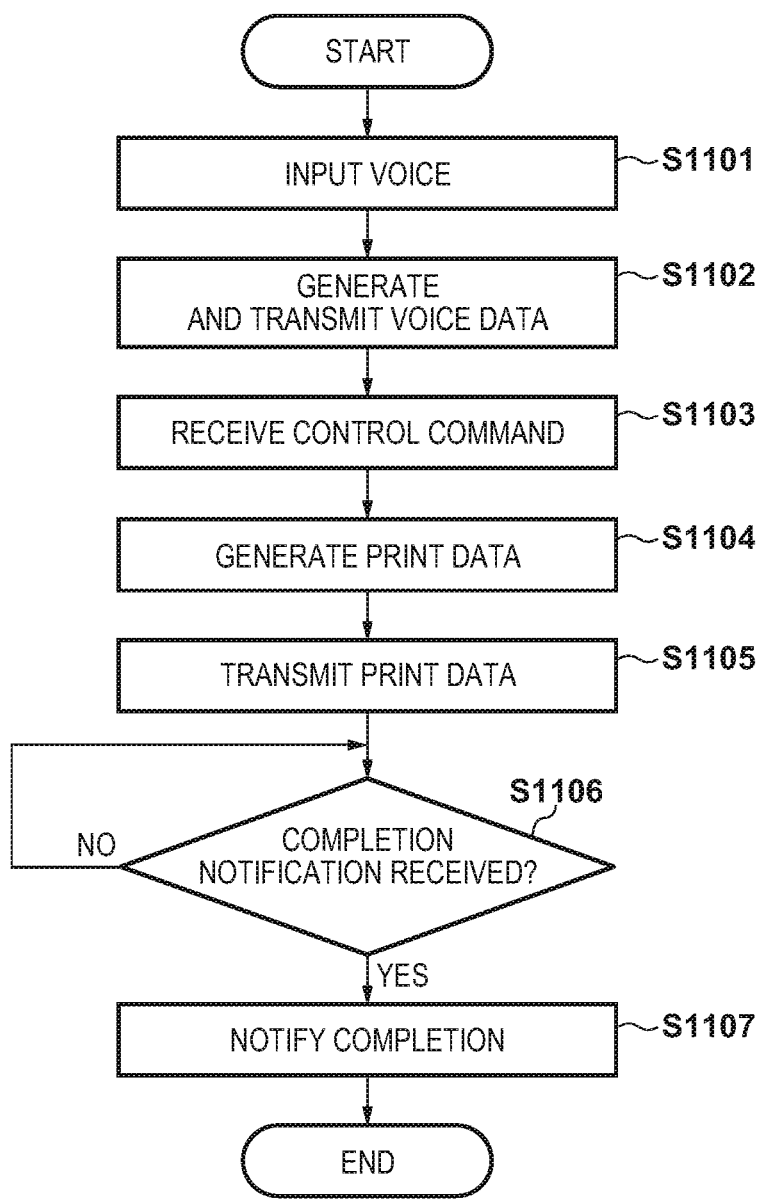

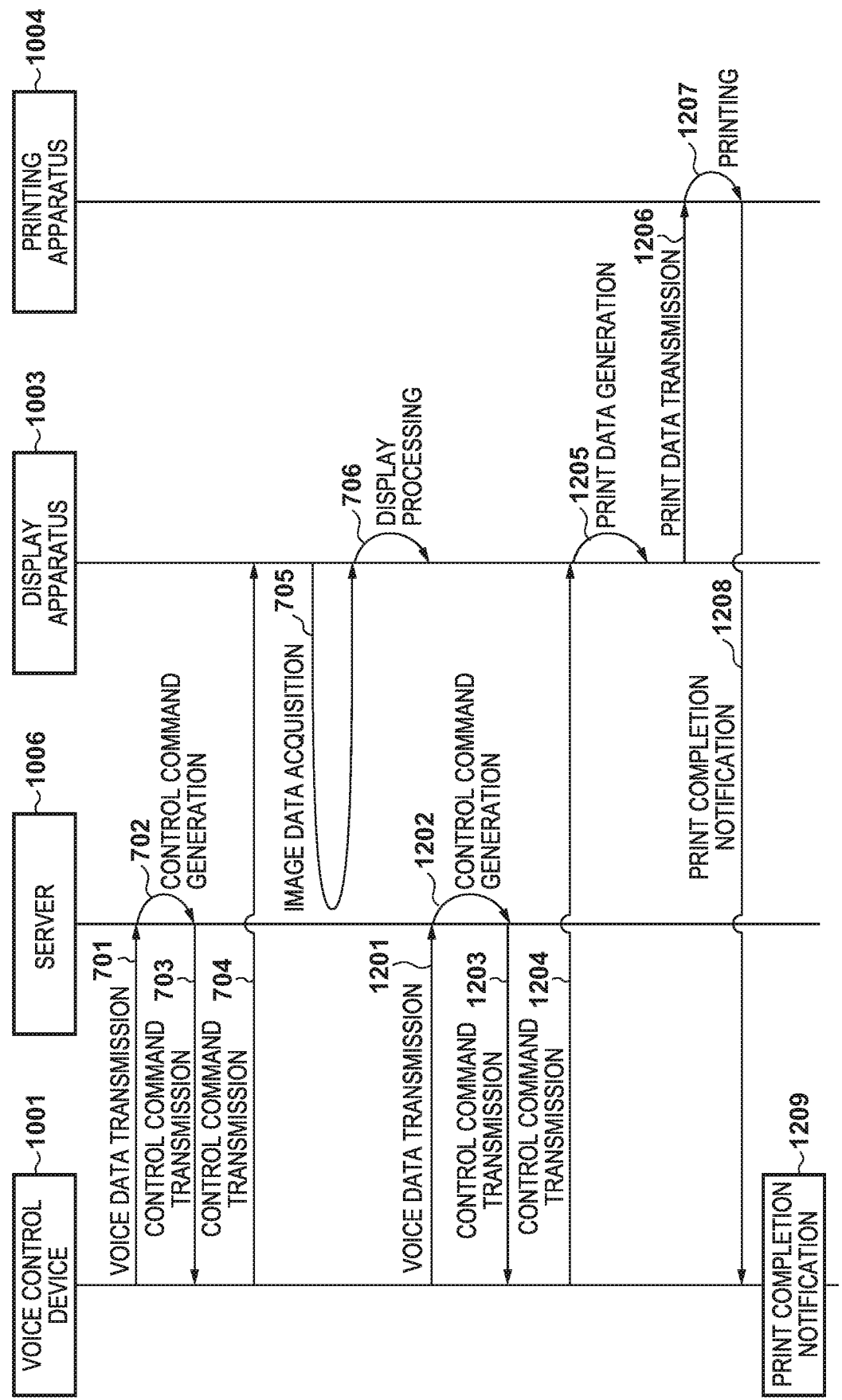

F I G. 13

| ID | SETTING ITEM | SET VALUES |
|----|---|---|
| 1 | NUMBER OF COPIES | 1-9999 |
| 2 | PAPER TYPE | PLAIN PAPER, PHOTO PAPER, FINE ART PAPER, ENVELOPE, POSTCARD ・・・ |
| 3 | PRINT QUALITY | FINE, STANDARD, DRAFT ・・・ |
| 4 | COLOR | COLOR, MONOCHROME, AUTO |
| 5 | DOUBLE-SIDED PRINTING | DOUBLE-SIDED, SINGLE-SIDED |
| 6 | PAPER SIZE | LETTER, LEGAL, A5, A, A3, B5, L SIZE, 2L SIZE ・・・ |
| 7 | PAPER ORIENTATION | PORTRAIT, LANDSCAPE, AUTO |
| 8 | PAGE LAYOUT | DIRECT, BORDERLESS FULL-PAGE PRINTING, ALLOCATION (2 PAGES/SHEET) ・・・ |
| 9 | BINDING LOCATION | LONG EDGE (LEFT), LONG EDGE (RIGHT), SHORT EDGE (LEFT), SHORT EDGE (RIGHT) |
| 10 | PAGE DESIGNATION | ALL, SELECTED PART, CURRENT PAGE, PAGE DESIGNATION |
| 11 | ・・・ | ・・・ |

F I G. 14

| | PRINT SETTING 1 (PHOTO) | PRINT SETTING 2 (DOCUMENT) |
|---|---|---|
| NUMBER OF COPIES | 1 | 1 |
| PAPER TYPE | PHOTO PAPER | PLAIN PAPER |
| PRINT QUALITY | FINE | STANDARD |
| COLOR | COLOR | AUTO |
| DOUBLE-SIDED/SINGLE-SIDED | SINGLE-SIDED | DOUBLE-SIDED |
| PAPER SIZE | L SIZE | A4 |
| PAPER ORIENTATION | AUTO | AUTO |
| PAGE LAYOUT | BORDERLESS FULL-PAGE PRINTING | 2 PAGES/SHEET |
| BINDING LOCATION | — | LONG EDGE (LEFT) |
| PAGE DESIGNATION | ALL | ALL |
| ... | ... | ... |

PRINT CONTROL SYSTEM THAT TRANSMIT TO A REGISTERED PRINTING APPARATUS, A CHANGE INSTRUCTION FOR CHANGING A SETTING OF THE POWER OF THE REGISTERED PRINTING APPARATUS, AND RELATED METHOD

This application claims the benefit of Japanese Patent Application No. 2017-221997, filed Nov. 17, 2017, and Japanese Patent Application No. 2018-154693, filed Aug. 21, 2018, which are hereby incorporated by reference herein in their entireties.

BACKGROUND OF THE INVENTION

Field of the Invention

The present invention relates to a server system including a voice control device, a method, and a non-transitory computer-readable storage medium storing a program.

Description of the Related Art

Japanese Patent Laid-Open No. 2016-502192 discloses techniques of performing various kinds of processing by instructing a conventional voice control device by voice. A connected printing apparatus can be caused to perform printing using these techniques.

In some cases, a user displays a screen provided by an output apparatus on a display apparatus and performs setting of the output apparatus by a remote operation from the display apparatus. Japanese Patent Laid-Open No. 2016-502192 does not, however, mention that the user displays a screen concerning the output apparatus on the display apparatus by a voice instruction.

SUMMARY OF THE INVENTION

An object of the present invention is to eliminate the above-mentioned problems with the conventional technology. The present invention provides a server system including a voice control device, which displays a screen concerning a printing apparatus on a display apparatus, a method, and a non-transitory computer-readable storage medium storing a program.

According to one aspect, the present invention provides a server system capable of communicating with a printing apparatus via an access point, the system comprising a first transmission unit configured to transmit, based on performing of a setting instruction concerning a setting of the printing apparatus by voice for a voice control device, setting information based on the setting instruction to the printing apparatus, wherein setting processing based on the setting information is executed by the printing apparatus, and a second transmission unit configured to transmit information concerning the setting processing executed in the printing apparatus to the voice control device, wherein the voice control device is connected to the access point by an instruction from another apparatus connected to the voice control device, wherein first information concerning the setting processing executed in the printing apparatus is notified by voice by the voice control device, and wherein second information is displayed, as the information concerning the setting processing executed in the printing apparatus, by a display apparatus connected to the access point to which the voice control device is connected.

According to the present invention, since it is possible to display the screen concerning the printing apparatus on the display apparatus by a simpler instruction, the operability improves.

Further features of the present invention will become apparent from the following description of exemplary embodiments with reference to the attached drawings.

BRIEF DESCRIPTION OF THE DRAWINGS

FIG. 10 is a sequence chart showing a sequence associated with print processing.
FIG. 11 is a flowchart showing the processing of the voice control device.
FIG. 12 is a sequence chart showing a sequence associated with print processing.
FIG. 13 is a view showing print setting items.
FIG. 14 is a view showing registered print settings.

DESCRIPTION OF THE EMBODIMENTS

Figure 1:
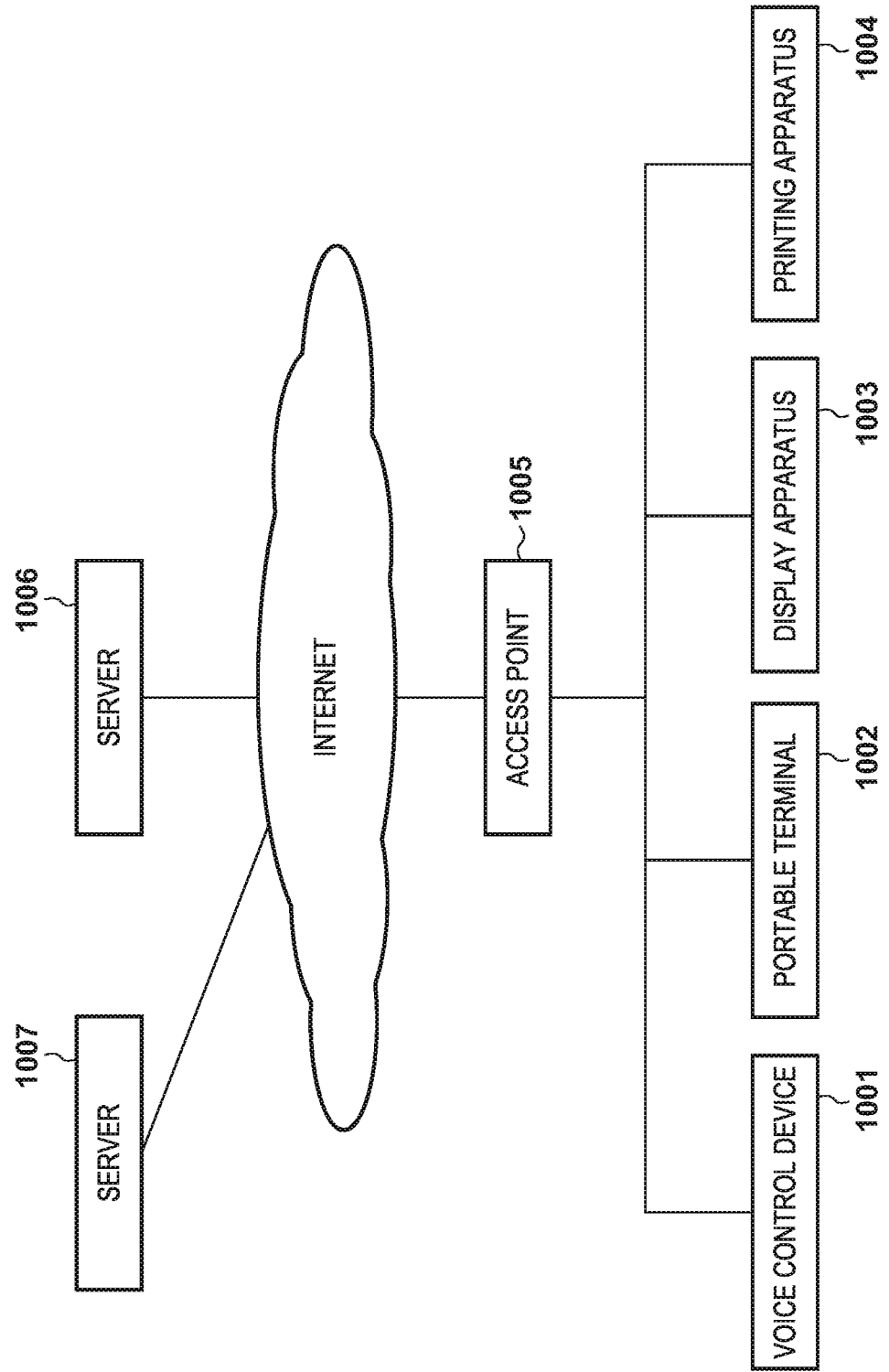
FIG. 1 is a block diagram showing a system configuration.

Preferred embodiments of the present invention will now be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

FIG. 1 shows an example of the configuration of a voice control system according to this embodiment. The system according to this embodiment includes, for example, a voice control device 1001, a portable terminal 1002, a display apparatus 1003, a printing apparatus 1004, an access point (AP) 1005, and a server 1006 (information processing apparatus). This system is a system capable of controlling a printing apparatus, and the like, by a voice command received by the voice control device. The voice control device 1001 is, for example, a smart speaker. The portable terminal 1002 is, for example, an arbitrary portable terminal, such as a smartphone, a notebook personal computer (PC), a tablet terminal, or a Personal Digital Assistant (PDA). Note that a description will be made below assuming that the portable terminal 1002 is a smartphone. Additionally, in this embodiment, a desktop PC may be used as the portable terminal 1002. Hence, the portable terminal is sometimes called a terminal apparatus. The display apparatus 1003 is, for example, an apparatus, such as a television (TV) or a display having a display function. The printing apparatus 1004 is, for example, a printer, but may be a copying machine, a facsimile apparatus, a digital camera, or the like. In addition, the printing apparatus 1004 may be a multifunction peripheral having a plurality of functions, such as a copy function, a facsimile (fax) function, and a printing function. That is, the printing apparatus 1004 is an output apparatus that performs printing, display, and the like, and the output form is not limited to printing. Note that if the printing apparatus 1004 is an apparatus for executing a printing function, it is a printer, such as an inkjet printer, a full-color laser beam printer, or a monochrome printer.

The voice control device 1001, the portable terminal 1002, the display apparatus 1003, and the printing apparatus 1004 can be connected to (communicate with) the server 1006 via the AP 1005 and the Internet. In addition, the voice control device 1001, the portable terminal 1002, the display apparatus 1003, and the printing apparatus 1004 can be connected to (communicate with) each other via the AP 1005. FIG. 1 shows each device as a single device. Each device may, however, include a plurality of devices connected.

Arrangement of Voice Control Device 1001

Figure 2:
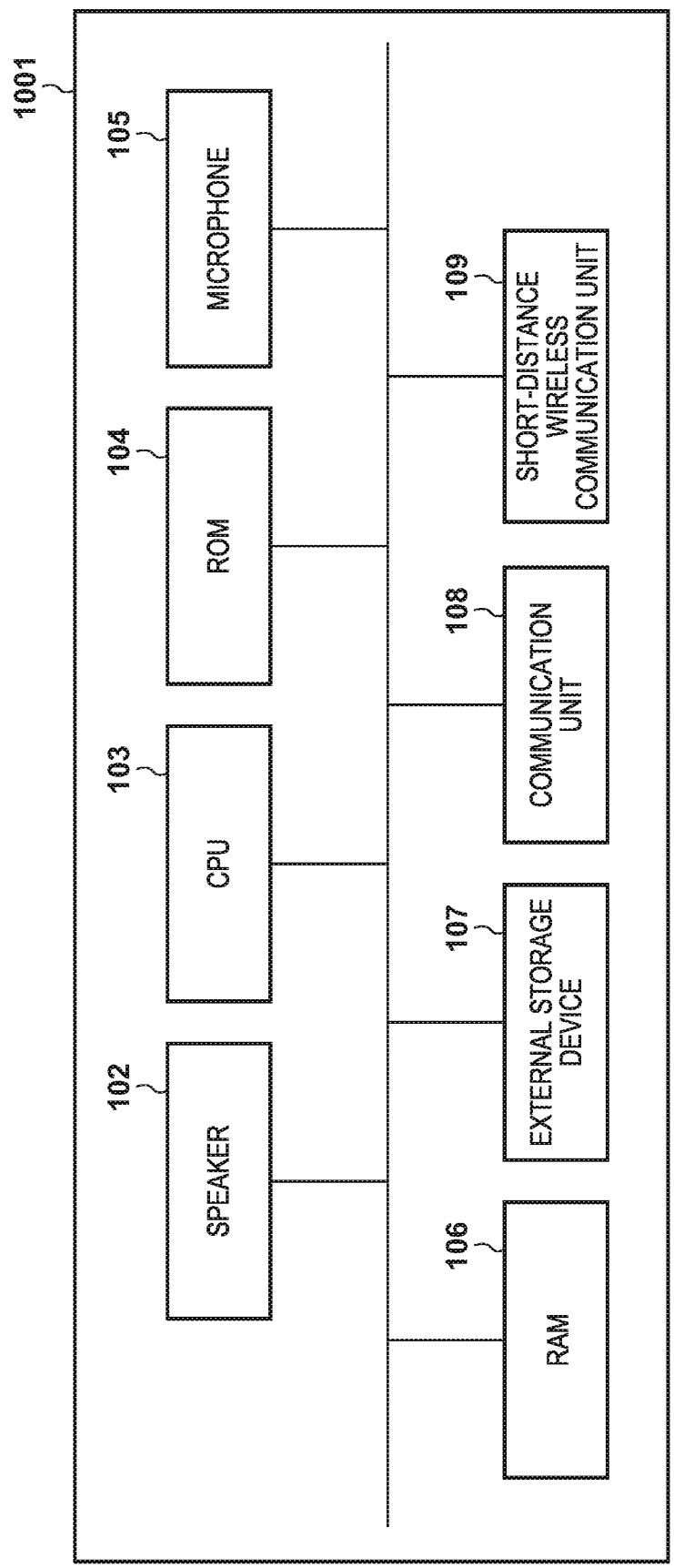
FIG. 2 is a block diagram showing the hardware arrangement of a voice control device.

FIG. 2 is a block diagram showing the hardware arrangement of the voice control device 1001. The voice control device 1001 includes a speaker 102, a central processing unit (CPU), a read only memory (ROM) 104, a microphone 105, a random access memory (RAM) 106, an external storage device 107, a communication unit 108, and a short-distance wireless communication unit 109. Note that the blocks shown in FIGS. 2 to 4 and 8 are connected to each other using, for example, an internal bus. Note that the components are merely examples, and each device may include hardware other than the illustrated pieces of hardware. A plurality of blocks shown in FIGS. 2 to 4 and 8 may be integrated into one block and thus implemented. Alternatively, one block may be divided into two or more blocks and thus implemented. That is, each device can have an arbitrary arrangement within a scope in which processing to be described later can be executed.

The speaker 102 generates a voice by processing to be described later. The CPU 103 is a system control unit and controls the entire voice control device 1001. The ROM 104 stores fixed data, such as control programs to be executed by the CPU 103, data tables, and an embedded Operating System (OS) program. In this embodiment, the control programs stored in the ROM 104 are used to perform software execution control, such as scheduling, task switch, and interrupt processing under the management of the embedded OS stored in the ROM 104. The microphone 105 receives a voice command on the periphery of the voice control device. When a voice command uttered by a user is received, the voice command is converted into electronic data via the microphone 105 and stored in the RAM 106. For example, the RAM 106 that receives the voice command uttered by the user is formed by an Static RAM (SRAM), or the like, which needs a backup power supply. Note that the RAM 106 holds data by a primary battery for backup and can, therefore, store data, such as a program control variable, without volatilizing it. In addition, a memory area to store the setting information and management data of the voice control device 1001 is also provided in the RAM 106. The RAM 106 is also used as the main memory and the work memory of the CPU 103. The external storage device 107 stores application software.

The communication unit 108 includes a circuit and an antenna configured to perform communication in accordance with a predetermined wireless communication method. For example, the communication unit 108 can wirelessly be connected to the AP 1005. In addition, the communication unit 108 sometimes operates as an AP that is temporarily used. Note that the AP 1005 can be, for example, a device, such as a wireless local area network (LAN) router. The wireless communication used in this embodiment may have a capability of operating in accordance with the wireless communication method of a wireless LAN complying with the Institute of Electrical and Electronics Engineers (IEEE) 802.11 standard series or may have a capability of operating in accordance with another wireless communication method. In this embodiment, the IEEE 802.11 standard series includes a series of standards belonging to IEEE 802.11, like IEEE 802.11a and IEEE 802.11b.

The short-distance wireless communication unit 109 executes short-distance wireless communication with another device existing within a predetermined range (within the short-distance range) from the voice control device 1001. Note that the short-distance wireless communication unit 109 performs communication using a wireless communication method different from that of the communication unit 108. In this embodiment, the short-distance wireless communication unit 109 operates in accordance with the Bluetooth® standard. Additionally, in this embodiment, the communication speed of the wireless communication using the communication unit 108 is greater than the communication speed of the short-distance wireless communication using the short-distance wireless communication unit 109. Furthermore, in this embodiment, the communication distance of the wireless communication using the communication unit 108 is longer than the communication distance of the short-distance wireless communication using the short-distance wireless communication unit 109. Note that this also applies to the communication units and the short-distance wireless communication units of other apparatuses to be described later.

Arrangement of Portable Terminal 1002 and Display Apparatus 1003

Figure 3:
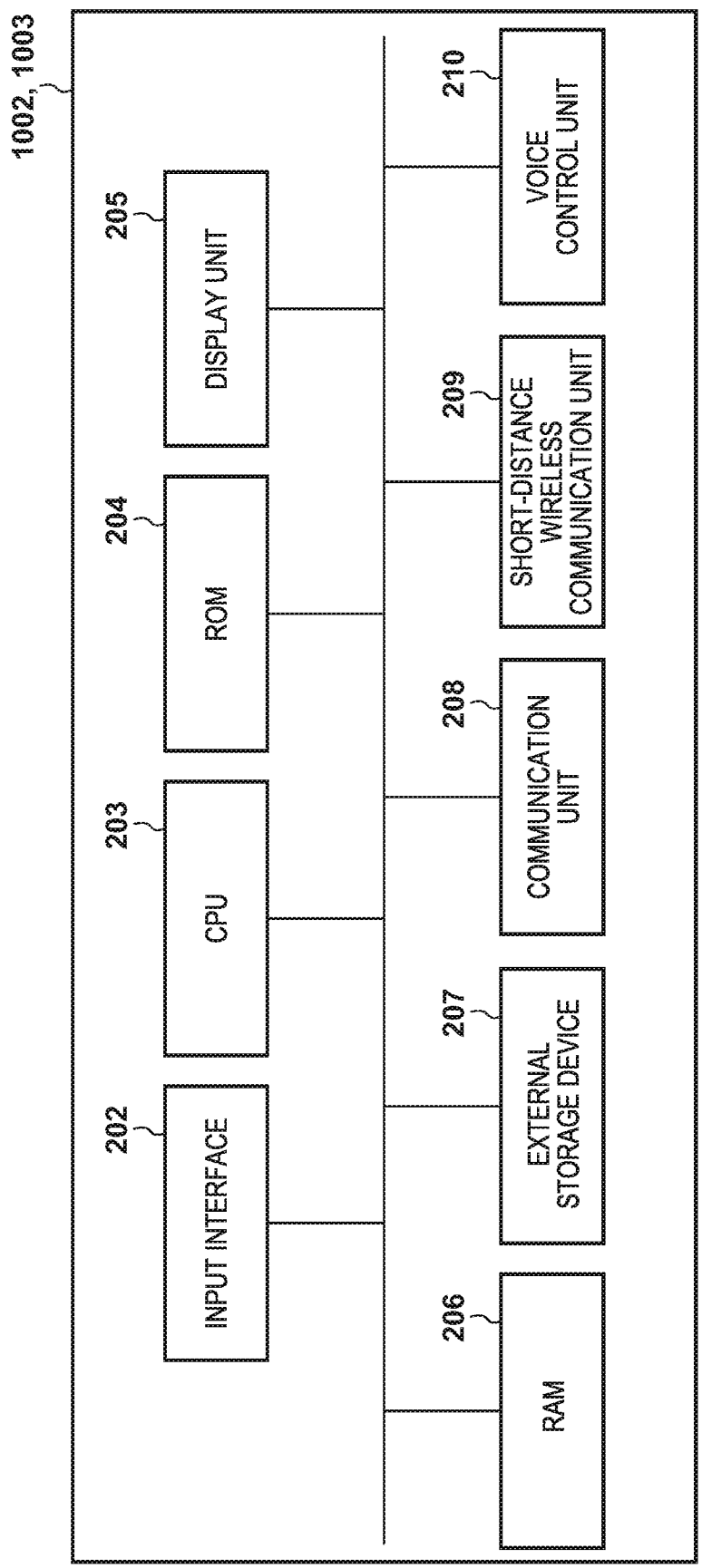
FIG. 3 is a block diagram showing the hardware arrangement of a portable terminal and a display apparatus.

FIG. 3 is a block diagram showing the hardware arrangement of the portable terminal 1002 and the display apparatus 1003. Each of the portable terminal 1002 and the display apparatus 1003 includes, for example, an input interface 202, a CPU 203, a ROM 204, a display unit 205, a RAM 206, an external storage device 207, a communication unit 208, and a short-distance wireless communication unit 209. Note that these blocks are connected to each other using, for example, an internal bus.

The CPU 203 is a system control unit and controls the entire apparatus. The RAM 206 is formed by a Dynamic RAM (DRAM), or the like, which needs a backup power supply, like, for example, the RAM 106. The RAM 206 is also used as the main memory and the work memory of the CPU 203. The ROM 204 stores fixed data, such as control programs to be executed by the CPU 203, data tables, and an OS program.

The communication unit 208 has the same function as that of the above-described communication unit 108 and can wirelessly be connected to another device via the AP 1005. The short-distance wireless communication unit 209 is a device capable of performing short-distance wireless communication with the short-distance wireless communication unit 109 using the same wireless communication method as that of the short-distance wireless communication unit 109.

In this embodiment, the portable terminal 1002 and the display apparatus 1003 are explained as independent different apparatuses. They may, however, be integrated. That is, for example, the portable terminal 1002 may be used as the display apparatus 1003. In addition, the portable terminal 1002 may be used as the voice control device 1001. In this case, the portable terminal 1002 may include, for example, a voice control unit 210 that operates with the functions of both the speaker 102 and the microphone 105. The voice control unit 210 can receive, by the microphone, a language uttered as a voice command by the user. The CPU 203 analyzes the language, thereby converting the voice command into an electronic instruction. For example, when the user utters a device name by voice command, the voice data is received and analyzed, thereby recognizing it as the identification (ID) of a specific device. In addition, contents stored in the RAM 206 can be converted into a language understandable by a human and output as a voice command from the speaker. For example, a list of device IDs held in the RAM 206 can be converted into a language (names or the like) understandable by a human and output as a voice command.

Arrangement of Printing Apparatus 1004

Figure 4:
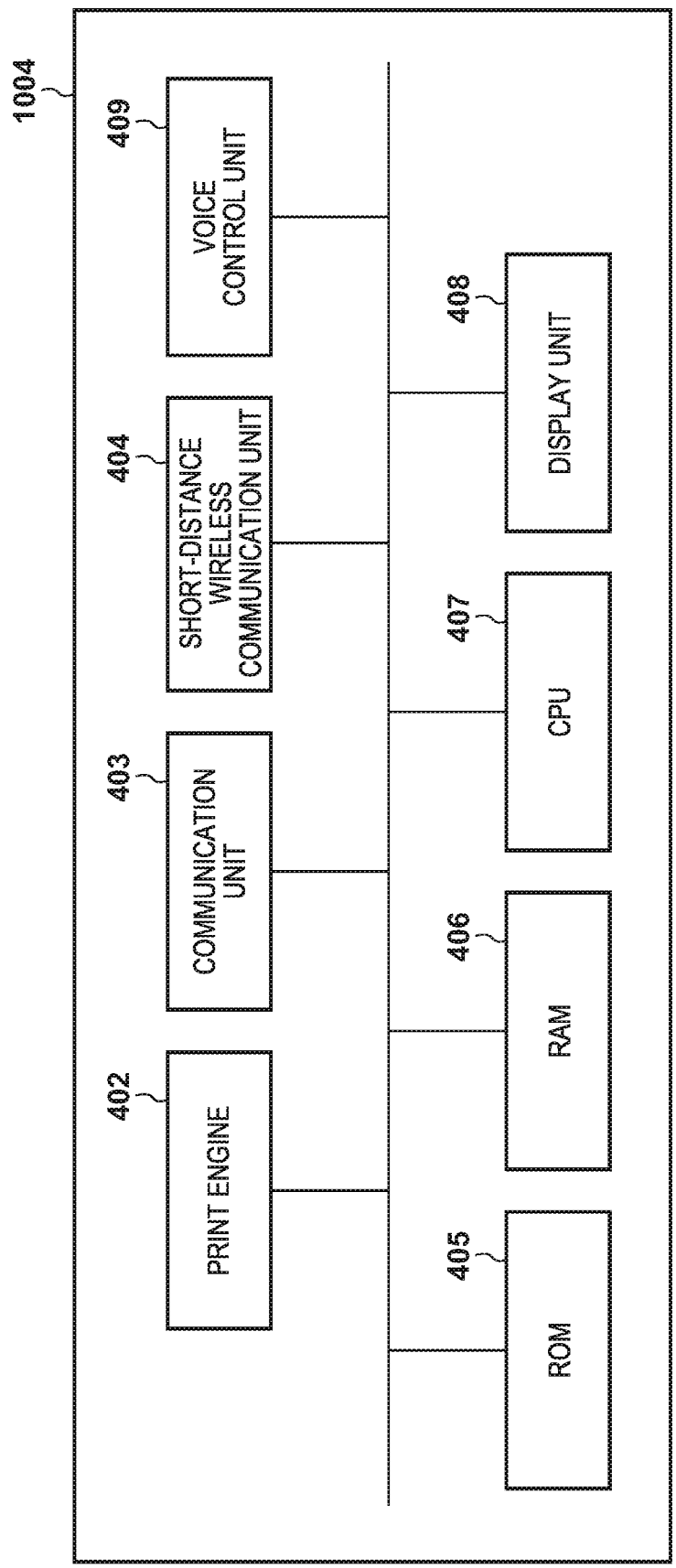
FIG. 4 is a block diagram showing the hardware arrangement of a printing apparatus.

FIG. 4 is a block diagram showing the hardware arrangement of the printing apparatus 1004. The printing apparatus 1004 includes, for example, a print engine 402, a communication unit 403, a short-distance wireless communication unit 404, a ROM 405, a RAM 406, a CPU 407, a display unit 408, and a voice control unit 409.

The CPU 407 is a system control unit and controls the entire printing apparatus 1004. The RAM 406 is formed by a DRAM, or the like, which needs a backup power supply, like, for example, the RAM 106. The RAM 406 is also used as the main memory and the work memory of the CPU 407. The ROM 405 stores fixed data, such as control programs to be executed by the CPU 407, data tables, and an OS program.

The communication unit 403 has the same function as that of the above-described communication unit 108 and can wirelessly be connected to another device via the AP 1005. The short-distance wireless communication unit 404 is a device capable of performing short-distance wireless communication with the short-distance wireless communication unit 109 using the same wireless communication method as that of the short-distance wireless communication unit 109.

The print engine 402 forms an image on a print medium, such as paper, using a printing material, such as ink, based on a print job received via the communication unit 403 and outputs the printing result.

The display unit 408 is an interface configured to receive a data input or an operation instruction from the user, and includes an operation panel formed by a physical keyboard and buttons, a touch panel, or the like. The voice control unit 409 can receive, by a microphone, a language uttered as a voice command by the user. The CPU 407 analyzes the language, thereby converting the voice command into an electronic instruction. For example, when the user utters a device name by voice command, the voice data is received and analyzed, thereby recognizing it as the ID of a specific device. In addition, contents stored in the RAM 406 can be converted into a language understandable by a human and output as a voice command from a speaker. For example, a list of device IDs held in the RAM 406 can be converted into a language (names or the like) understandable by a human and output as a voice command.

Setup of Voice Control Device 1001

Figure 5:
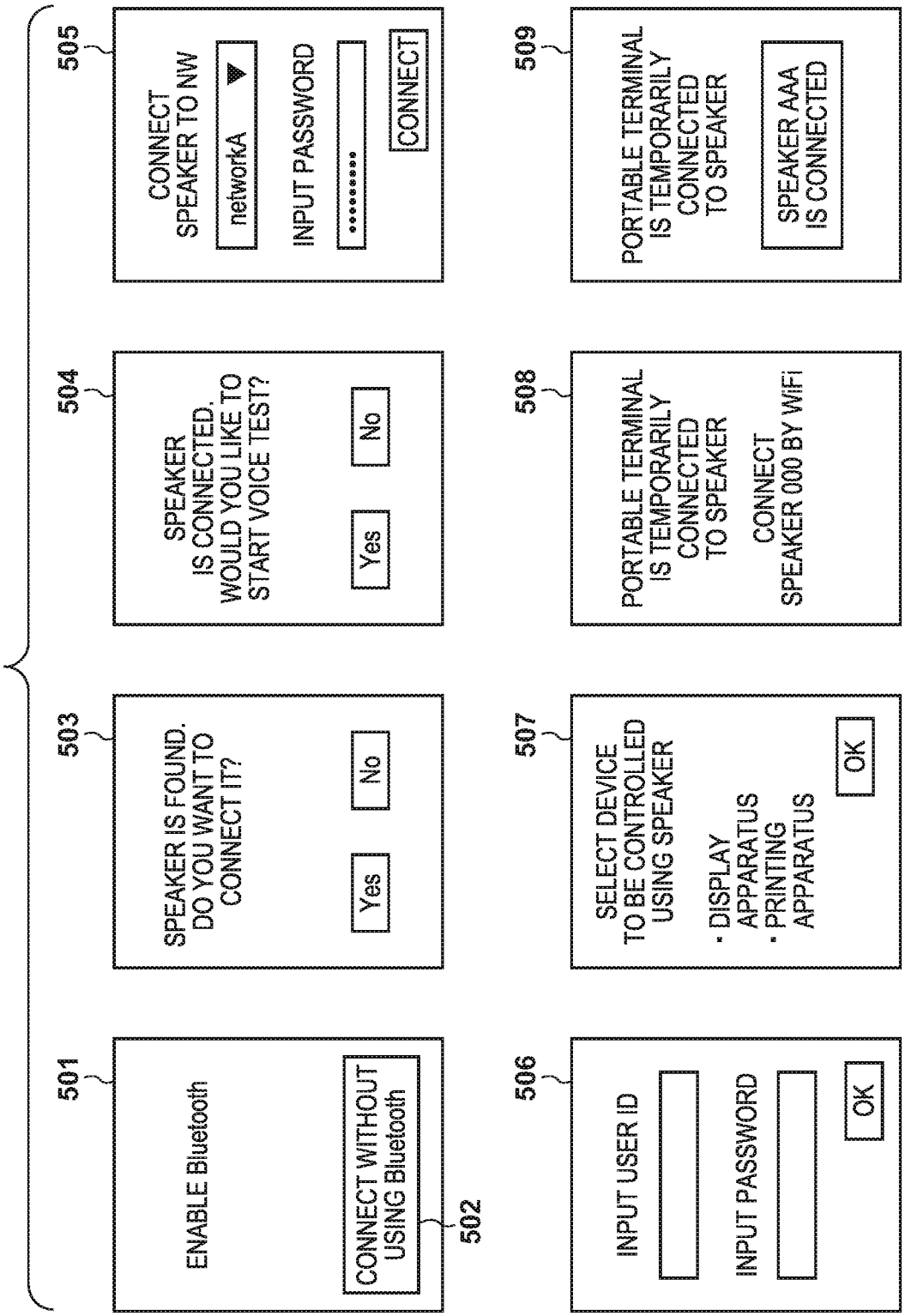
FIG. 5 is a view showing screens associated with setup of the voice control device.

Setup of the voice control device 1001 will be described next with reference to FIG. 5. FIG. 5 is a schematic view showing examples of screens displayed by the portable terminal 1002 for setup of the voice control device 1001. A management application for the voice control device 1001 is installed in advance in the portable terminal 1002.

When the management application is activated by a user operation, a screen 501 is displayed on the display unit 205 of the portable terminal 1002. Here, the user enables the short-distance wireless communication unit 209 (for example, Bluetooth®) of the portable terminal 1002 in accordance with a message displayed on the screen 501. When the voice control device 1001 is activated, it generates a beacon including a specific identifier. If the beacon generated by the voice control device 1001 is received using the management application, the portable terminal 1002 displays a screen 503. When the "Yes" button is pressed on the screen 503, short-distance wireless connection is established between the portable terminal 1002 and the voice control device 1001.

When the short-distance wireless connection between the portable terminal 1002 and the voice control device 1001 is established, a screen 504 is displayed on the display unit 205 of the portable terminal 1002. Here, when the user presses the "Yes" button on the screen 504, voice data is transmitted from the portable terminal 1002 to the voice control device 1001 via the short-distance wireless connection, and a voice command is output from the speaker 102 to the voice control device 1001. Note that the portable terminal 1002 may transmit a notification instruction by voice command to the voice control device 1001 via the short-distance wireless connection, and the voice command may thus be output from the speaker 102 of the voice control device 1001. If the voice command is output from the voice control device 1001, the user presses a "test completion button" displayed next to the screen 504, whereby a screen 505 is displayed on the display unit 205 of the portable terminal 1002.

On the screen 505, the user inputs the service set identifier (SSID) and the password of an AP that should be connected to the voice control device 1001 to the screen 505 and presses the connect button. Basically, the user inputs, using the screen 505, the SSID and the password of the AP 1005 (the AP 1005 that is being wirelessly connected) to which the portable terminal 1002 is already wirelessly connected using the communication unit 208. With this processing, the portable terminal 1002 transmits the SSID and the password to the voice control device 1001 via the short-distance wireless connection. The voice control device 1001 establishes wireless connection with the AP 1005 using the SSID and the password received via the short-distance wireless connection. That is, the voice control device 1001 participates in the network formed by the AP 1005. With the above-described processing, the voice control device 1001 and the portable terminal 1002 can perform wireless communication via the AP 1005 (via the network formed by the AP 1005).

Next, the user inputs a user ID and a password needed to log in to the server 1006 using a screen 506 displayed on the portable terminal 1002. Note that the user ID and the password input in the screen 506 are transmitted from the portable terminal 1002 to the voice control device 1001 via the short-distance wireless connection or the AP 1005. The voice control device 1001 signs in to the server 1006 using the user ID and the password received from the portable terminal 1002. At this time, the voice control device 1001 transmits the Mac address of itself as well. This allows the voice control device 1001 to use a service provided by the server 1006 to the user. That is, the server 1006 manages the Mac address of the voice control device 1001 and the user ID in association with each other. Here, the voice control device 1001 may receive the access token of the server 1006.

Using a screen 507 displayed next to the screen 506, the user selects a device to be controlled using the voice control device 1001. Assume here that the user selects the display apparatus 1003 and the printing apparatus 1004 as indicated by the screen 507. Devices displayed on the screen 507 are displayed when the portable terminal 1002 searches for the devices (apparatuses) in the network via the AP 1005. At this time, as the result of device search processing, the portable terminal 1002 acquires the Mac address, internet protocol (IP) address, and the like, of each device at the time of the device search. For this reason, when the OK button is pressed in the screen 507, the portable terminal 1002 transmits the Mac address and the IP address of each device to the voice control device 1001.

Note that setup of the voice control device 1001 may be performed using another method. For example, when the voice control device 1001 is activated (or a setup mode is enabled), the communication unit 108 of the voice control device 1001 may operate as a software AP to do setup. As a detailed example, for example, when "connect without using Bluetooth" 502 is pressed on the screen 501, the portable terminal 1002 displays a screen 508. The user operates the portable terminal 1002 in accordance with contents displayed on the screen 508. By this user operation, the portable terminal 1002 establishes wireless connection with the software AP of the voice control device 1001 using the communication unit 208. Note that the portable terminal 1002 may establish the wireless connection with the software AP of the voice control device 1001 in accordance with an instruction of the management application. That is, the connection destination of the communication unit 208 of the portable terminal 1002 is temporarily switched from the AP 1005 to the software AP of the communication unit 108 of the voice control device 1001 in accordance with a user operation or an instruction of the management application. When the wireless connection is established between the communication unit 208 of the portable terminal 1002 and the communication unit 108 of the voice control device 1001 by such a control, a screen 509 is displayed.

Note that as subsequent processing, information (the SSID, the password, and the like) input to the screen 505 is transmitted via the wireless connection established between the communication unit 208 of the portable terminal 1002 and the communication unit 108 of the voice control device 1001. After that, to perform wireless communication between the portable terminal 1002 and the voice control device 1001 via the AP 1005, the portable terminal 1002 switches the connection destination to the AP 1005. In addition, the voice control device 1001 disables the software AP and is wirelessly connected to the AP 1005 using the communication unit 108.

As described above, the voice control device 1001 can receive the pieces of information (the SSID, the password, and the like) concerning the AP 1005 that is an external access point from the portable terminal 1002 by wireless communication via the access point provided in the voice control device 1001. In addition, the voice control device 1001 can execute reception processing of receiving the pieces of information (the SSID, the password, and the like) concerning the external AP 1005 from the portable terminal 1002 via the short-distance wireless communication. The voice control device 1001 may have only one of the two reception processing functions described above or may have both the reception processing functions. Alternatively, the voice control device 1001 may be connected to the external access point 1005 and establish wireless communication by another reception processing function.

Sign-in Processing of Printing Apparatus 1004 to Server 1006

Processing of causing the printing apparatus 1004 to sign in to the server 1006 will be described next. For example, in the Internet, the server 1006 corresponding to the voice control device 1001, and a server 1007 that does not correspond to the voice control device 1001 exist. To implement cooperation between the voice control device 1001 and the printing apparatus 1004, the printing apparatus 1004 needs to sign in not to the server 1007, but needs to sign in to the server 1006.

Figure 6:
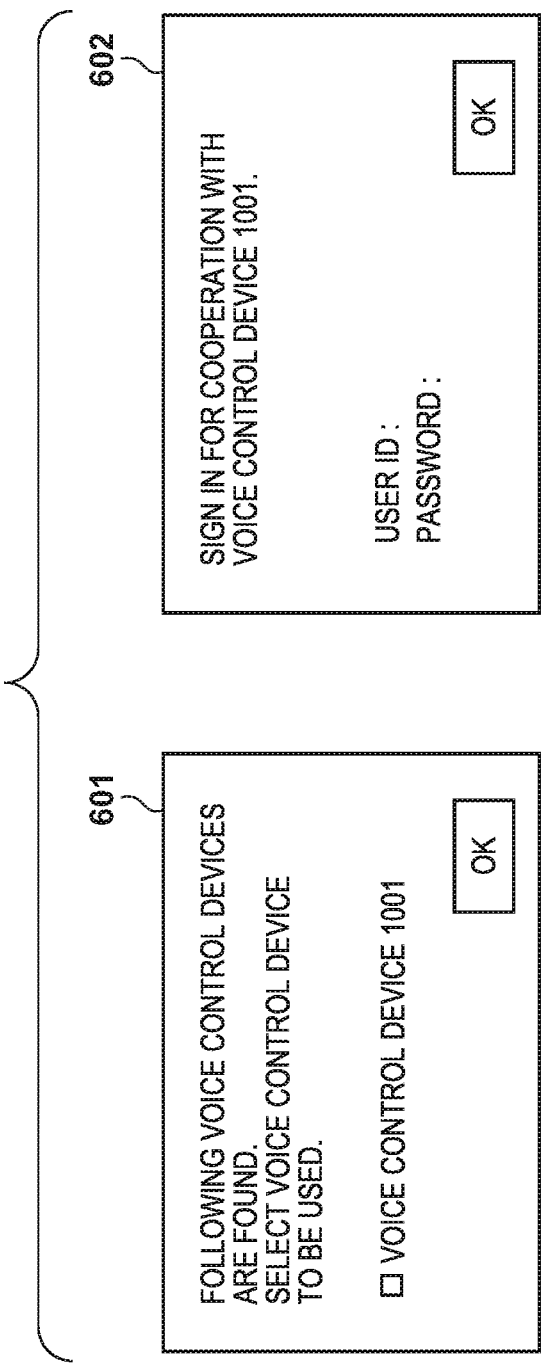
FIG. 6 is a view showing screens displayed by the printing apparatus.

For this purpose, the printing apparatus 1004 has a voice control device cooperation mode. When the voice control device cooperation mode is enabled, the printing apparatus 1004 performs a device search in the network in which it participates and finds the voice control device 1001. To notify that the voice control device 1001 is found as the result of the device search, a screen 601 shown in FIG. 6 is displayed on the display unit 408 of the printing apparatus 1004. When the user selects the voice control device 1001 and presses the OK button on the screen 601, a screen 602 is displayed on the display unit 408 of the printing apparatus 1004. Note that information acquired by the device search includes, for example, the URL of the server 1006 corresponding to the voice control device 1001. Using the URL, the printing apparatus 1004 can display the screen 602 used to sign in to the server 1006. Then, the printing apparatus 1004 can sign in to the server 1006 using information (the User ID, the password, and the like) input to the screen 602. With the above-described processing, the printing apparatus 1004 can sign in to the server 1006 and handle image data managed by the server 1006.

In addition, when the printing apparatus 1004 performs the device search, and the voice control device capable of corresponding to the server 1007 is thus found, the printing apparatus 1004 displays a screen used to sign in to the server 1007.

Note that another process may be executed as the processing of causing the printing apparatus 1004 to sign in to the server 1006. An example of the other processing will be described. First, a state in which the portable terminal 1002 has completed sign-in to the server 1006 is obtained. For example, the user signs in to the server 1006 using the above-described screen 506. When the portable terminal 1002 finds the printing apparatus 1004 via the AP 1005, the portable terminal 1002 displays the identification information of the printing apparatus 1004 and a registration button. For example, the registration button may be displayed next to the printing apparatus in the screen 507. Here, if the user presses the registration button, a registration request is transmitted from the portable terminal 1002 to the printing apparatus 1004. Note that the registration request includes the destination information of the server 1006.

Upon receiving the registration request, the printing apparatus 1004 displays, on the display unit 408 of the printing apparatus 1004, a selection screen to select whether to execute registration processing of the printer. Here, if the user selects execution of registration processing, the printing apparatus 1004 transmits a registration request including the Mac address of the printing apparatus 1004 to the server 1006 in accordance with the destination information included in the registration request. The printing apparatus 1004 then receives a response to the registration request from the server 1006. Note that the response includes a universal resource locator (URL) concerning the registration processing of the printing apparatus 1004. That is, the URL is a dedicated URL concerning the registration processing of the printing apparatus 1004.

The printing apparatus 1004 transmits the response received from the server 1006 to the portable terminal 1002. The portable terminal 1002 transmits a registration request to the server 1006 using the URL included in the received response. The registration request includes the user ID and the password already input to the portable terminal 1002 to sign in to the server 1006. If the correct user ID and password are received, the server 1006 that has received the registration request transmits a response representing that the registration request has succeeded to the portable terminal 1002. That is, since the registration request is received using the dedicated URL concerning the registration processing of the printing apparatus 1004, the server 1006 temporarily registers the printing apparatus 1004 as a printing apparatus for the user who has signed in to the portable terminal 1002. The server 1006 manages the user ID and the Mac address of the printing apparatus 1004 in association with each other. The portable terminal 1002 transmits completion information representing that the registration is completed to the printing apparatus 1004. Upon receiving the completion information, the printing apparatus 1004 transmits a registration request including the Mac address of the printing apparatus 1004 to the server 1006. The server 1006 identifies that the printing apparatus 1004 is in a temporarily registered state and returns a registration completion response.

With the above-described processing, the server 1006 formally registers the printing apparatus 1004 as the printing apparatus for the user that has signed in to the portable terminal 1002. Upon receiving the registration completion response from the server 1006, the printing apparatus 1004 transmits information representing registration completion to the portable terminal 1002. With the above-described processing, the printing apparatus 1004 may be unable to handle image data managed by the server 1006.

Processing Procedure of Print Instruction

Figure 7:
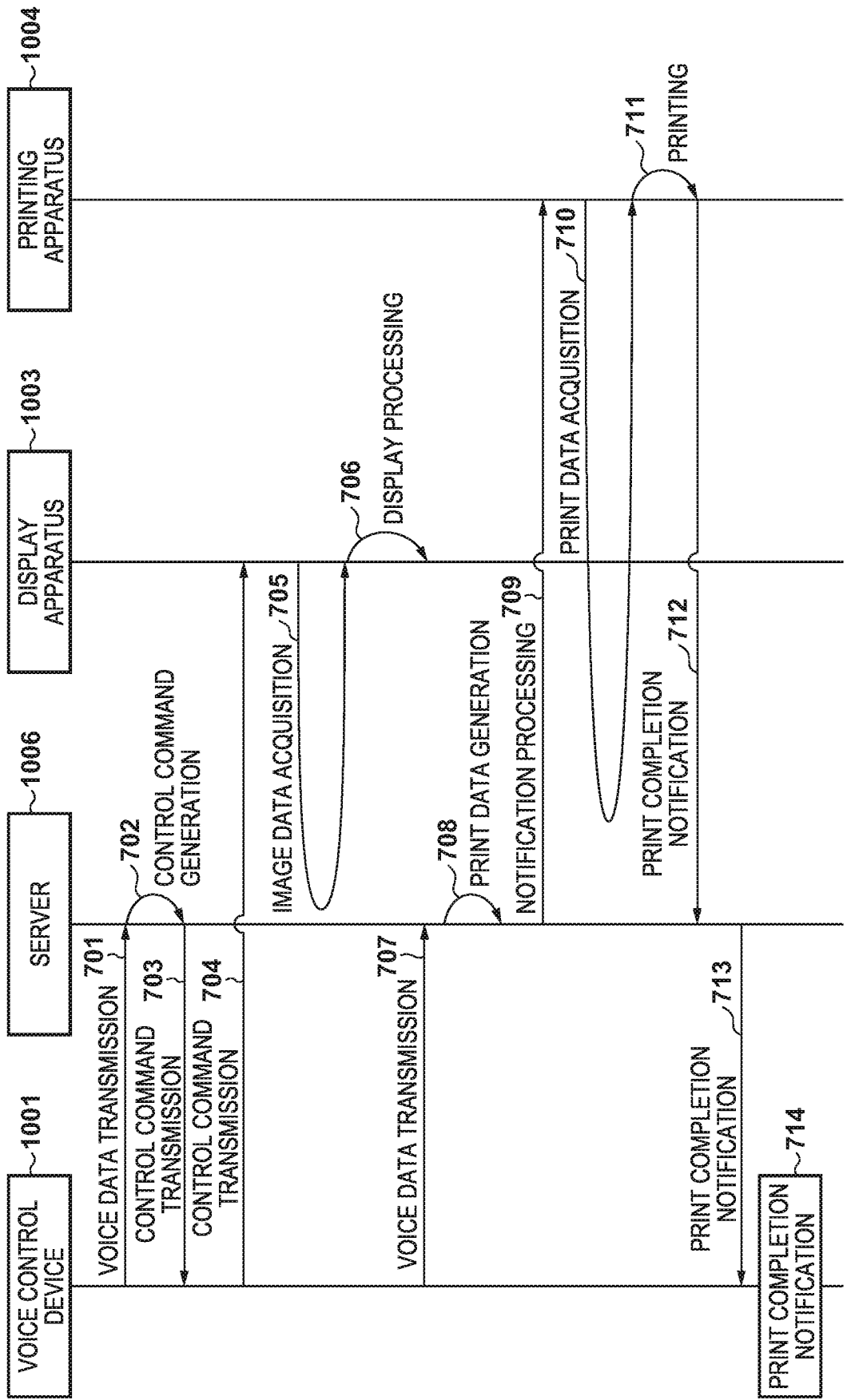
FIG. 7 is a sequence chart showing a sequence associated with print processing.

Processing of sending a print instruction to the printing apparatus 1004 via the voice control device 1001 will be described next with reference to FIG. 7. FIG. 7 is a sequence chart for explaining processing for causing the voice control device 1001 to make the printing apparatus 1004 execute print processing based on a print instruction by a voice uttered from the user. The function corresponding to this processing is implemented when the CPU of each device executes a corresponding program. Note that the display apparatus 1003 has already signed in to the server 1006. In addition, image data corresponding to a photo A to be described later is saved for the user by the server 1006.

Near the voice control device 1001, the user utters a wake word that is a predetermined keyword first and then utters what the user himself/herself wants to do. For example, the user utters the wake word and then utters "display the photo A". The voice control device 1001 receives the voice command of the wake word, thereby receiving the voice uttered next. That is, the voice control device 1001 receives the voice command "display the photo A".

The voice control device 1001 transmits the identification information (for example, the Mac address) of the voice control device 1001 and voice data based on the received voice command to the server 1006 (process 701).

The server 1006 specifies, from the Mac address of the voice control device 1001, the user ID associated with the Mac address, thereby recognizing that the voice control device 1001 is a device that has already signed in. The above-described access token may be used. The server 1006 analyzes the voice data transmitted from the voice control device 1001, generates a control command based on the voice data (process 702), and transmits the control command to the voice control device 1001 (process 703). Note that the control command includes a display processing command as processing contents to be executed and information representing the storage location of image data corresponding to the photo A as the display target.

The voice control device 1001 selects the transmission target of the control command received from the server 1006. Here, since the user utters "display the photo A" as the request from the user, the voice control device 1001 selects the display apparatus 1003 as the transmission destination. The voice control device 1001 transmits the control command to the selected display apparatus 1003 (process 704). Note that although the voice control device 1001 transmits the control command received from the server 1006 in the process 704, another command may be transmitted. That is, the voice control device 1001 may generate another command based on the control command received in the process 703 and transmit the other generated command to the display apparatus 1003. The process in which the voice control device 1001 transmits a control command is described in the following description (for example, the process 704 in FIG. 10, and the like). Another command generated based on the control command may be transmitted similarly. In this case, the device that has received the command can execute processing according to the other command.

The display apparatus 1003 executes processing according to the control command. The display apparatus 1003 first accesses the storage location included in the control command and acquires image data corresponding to the photo A from the storage location (process 705). Then, the display apparatus 1003 displays image data A corresponding to the photo A (process 706). Note that if a URL corresponding to the photo A is included in the control command, the display apparatus 1003 may access the URL, thereby displaying a web page including the photo A.

In a state in which the image data corresponding to the photo A is displayed on the display apparatus 1003, near the voice control device 1001, the user utters the wake word first and then utters what the user himself/herself wants to do. For example, the user utters the wake word and then utters "print the photo A displayed on the display apparatus 1003".

The voice control device 1001 receives the voice command of the wake word, thereby performing reception of the word uttered next. That is, the voice control device 1001 receives the voice command "print the photo A displayed on the display apparatus 1003", thereby receiving a print instruction by the voice command.

The voice control device 1001 transmits the voice data to the server 1006 (process 707). Note that the basic process is the same as the process 701.

The server 1006 analyzes the voice data transmitted from the voice control device 1001 and executes processing based on the voice data. Here, since the voice data of the voice command "print the photo A displayed on the display apparatus 1003" is received, the server 1006 generates print data based on the image data corresponding to the photo A (process 708).

Note that if the print instruction from the user is a simple instruction "print the photo A displayed on the display apparatus 1003" described above, pieces of information concerning a print setting are not included. That is, a print setting, such as the number of pages, the print size, the orientation of printing, the page layout (page allocation), double-sided/single-sided printing, and the like, needed when the printing apparatus 1004 prints the photo A is not included in the instruction. In this embodiment, if pieces of information concerning the print setting are not included in the voice data as the result of voice data analysis, the voice control device 1001 uses a predetermined print setting as the print setting of the image. Details will be described later with reference to FIGS. 9A and 9B.

Additionally, in this embodiment, as the process 708, another server different from the server 1006 may generate print data. For example, the manufacturer of the printing apparatus 1004 may provide a print server including software configured to generate print data. The server 1006 may request the print server to generate print data, and the print server may generate print data.

When the generation of print data is completed, the server 1006 transmits a notification representing that the generation of print data is completed to the printing apparatus 1004 (process 709). Upon receiving the notification representing that the generation of print data is completed, the printing apparatus 1004 accesses the server 1006, acquires the print data (process 710), and executes printing (process 711).

When the print processing is completed, the printing apparatus 1004 transmits a print completion notification to the server 1006 (process 712), and the server 1006 transmits the print completion notification to the voice control device 1001 (process 713). Upon receiving the print completion notification, the voice control device 1001 notifies the print completion by voice (process 714).

Arrangement of Server 1006

Figure 8:
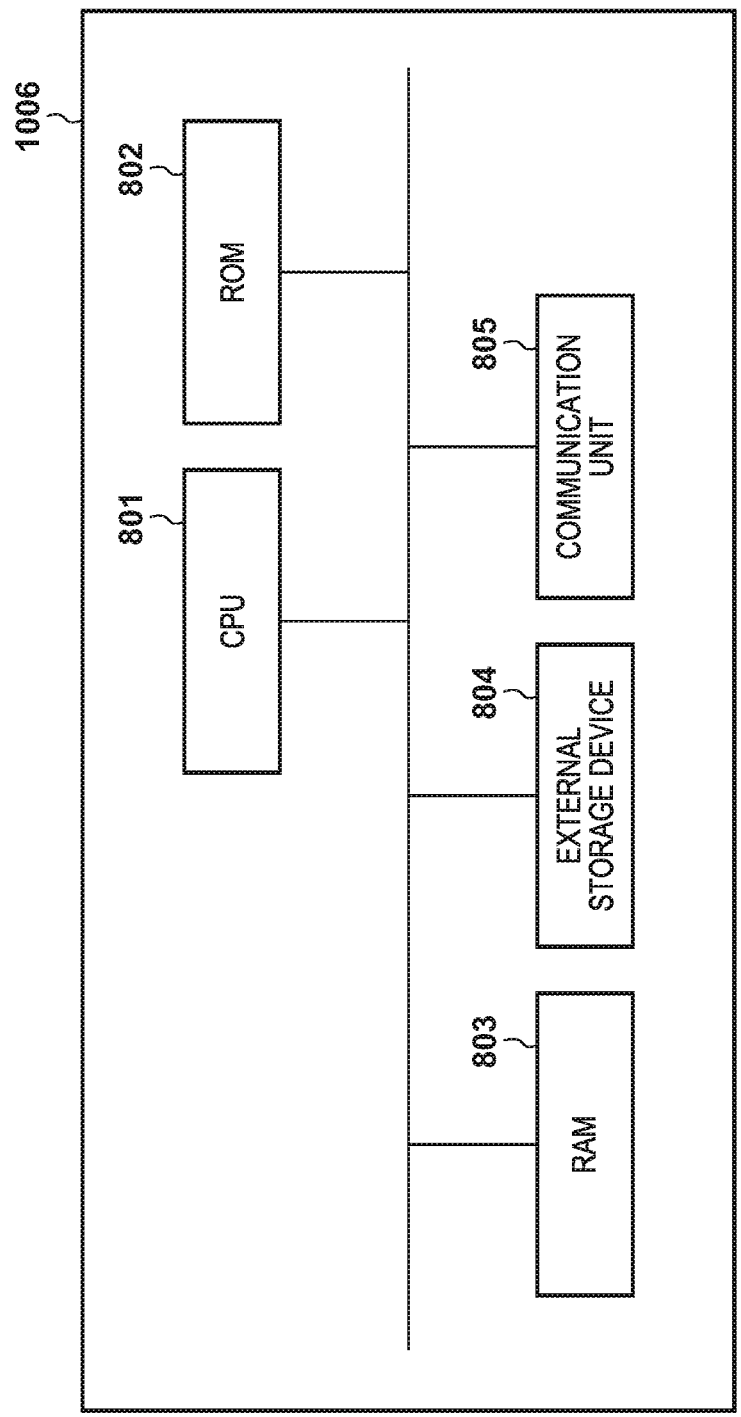
FIG. 8 is a block diagram showing the hardware arrangement of a server.

FIG. 8 is a block diagram showing the hardware arrangement of the server 1006. The server 1006 is an information processing apparatus including a CPU 801, a ROM 802, a RAM 803, an external storage device 804, and a communication unit 805. The CPU 801 is a system control unit and controls the entire server 1006. Note that in this embodiment, the server 1006 is formed by one server. A server system corresponding to the server 1006 may, however, be formed by causing a plurality of information processing apparatuses to cooperatively operate. The ROM 802 stores fixed, data such as control programs to be executed by the CPU 801, data tables, and an embedded OS (Operating System) program. The RAM 803 can store data, such as a program control variable, without volatilizing it because the data is held by a primary battery (not shown) for data backup. The external storage device 804 stores application software. Note that in FIG. 7, the server 1006 generates print data, as described above. For this reason, the external storage device 804 of the server 1006 stores print software that generates print data interpretable by the printing apparatus 1004. The communication unit 805 includes a circuit and an antenna configured to perform communication in accordance with a predetermined wireless communication method.

Details of Processing of Voice Control Device 1001 and Server 1006

Processing of the voice control device 1001 and the server 1006 in a case in which a print instruction is performed will be described next with reference to FIG. 9A. The flowchart of FIG. 9A corresponds to the processes 707 to 714 in FIG. 7. Note that in the voice control device 1001, when the CPU 103 loads a program concerning the processing of the flowchart from a memory, such as the ROM 104, and executes the program, the processing of the voice control device 1001 is executed. On the other hand, in the server 1006, when the CPU 801 loads a program concerning the processing of the flowchart from a memory, such as the ROM 802, and executes the program, the processing of the server 1006 is executed.

The CPU 103 inputs words (voice) uttered by the user on the periphery of the voice control device 1001 (step S901) and generates voice data based on the input voice. Then, the voice data is transmitted from the voice control device 1001 to the server 1006 (step S902).

Upon receiving the voice data, the CPU 801 analyzes the voice data and specifies the request of the user. The server 1006 receives, for example, voice data corresponding to a user request "print the photo A displayed on the display apparatus 1003" and determines whether the pieces of information concerning a print setting are included in the voice data (step S903).

If the pieces of information concerning the print setting are included in the voice data, the CPU 801 acquires the pieces of information concerning the print setting included in the voice data (step S904). On the other hand, if the pieces of information concerning the print setting are not included in the voice data, the CPU 801 acquires pieces of information concerning a predetermined print setting (step S905). Here, as the pieces of information concerning a predetermined print setting, pieces of information (values) concerning a print setting registered in the server in advance are acquired.

In step S906, the CPU 801 specifies image data corresponding to the photo A displayed on the display apparatus 1003 based on the voice data and generates print data based on the image data by applying the pieces of information concerning the print setting acquired in steps S904 to S905.

Next, the CPU 801 selects a printer to execute print processing (step S907). In this embodiment, the CPU 801 specifies a user ID associated with the Mac address of the voice control device 1001. Then, the server 1006 specifies the printing apparatus 1004 managed in association with the user ID. With the above-described processing, step S907 is implemented.

The CPU 801 transmits, to the printing apparatus 1004, a notification representing that the generation of print data is completed for the printer (printing apparatus 1004) selected in step S907 (step S908). After that, the CPU 801 determines whether a print completion notification is received from the printing apparatus 1004 (step S909).

Upon receiving the print completion notification from the printing apparatus 1004 in step S909, the CPU 801 transmits the print completion notification to the voice control device 1001 that is the print instruction source. Upon receiving the print completion notification, the CPU 103 notifies the print completion by voice command. More specifically, the CPU 103 converts the print completion notification into a voice command and outputs the print completion by voice command using the speaker 102.

With the above-described processing, the user can print a desired photo by a simple operation. In particular, even if an instruction concerning the print setting is not included in the instruction by the voice command of the user, print data is generated by applying a predetermined print setting.

Modification

In this embodiment, if the pieces of information concerning the print setting are not included in the voice data, the user may be confirmed to print using a predetermined print setting. More specifically, if the server 1006 determines in step S903 that the pieces of information concerning the print setting are not included in the voice data, the server 1006 generates a control command used to notify the voice control device 1001 that printing is performed using the predetermined print setting. Then, the server 1006 transmits the control command to the voice control device 1001. In accordance with the received control command, the voice control device 1001 notifies the user by voice command that printing is performed using the predetermined print setting. For example, a voice command "one copy of the photo A will be printed on photo paper with an L size under settings . . . (omit) . . . " is output. Note that the items of the print setting necessary for print data generation include a plurality of items. Hence, if all the items are output by voice command, the time until the user acquires desired information becomes long. Hence, the print setting items to be output by voice command may be only some representative setting items.

Alternatively, the user may be asked whether printing may be performed using a predetermined print setting by a question-type voice command "one copy of the photo A will be printed on photo paper with an L size under settings . . . (omit) . . . Is it OK?". In the case of the question-type voice command, the print setting is determined or changed upon receiving a response from the user to the question. That is, if a reply to approve the print setting (for example, a reply "OK") is received from the user, the voice control device 1001 transmits the voice data to the server 1006, and the server 1006 determines the print setting. On the other hand, if a reply to instruct different print setting (for example, a reply "print two copies") is received from the user, the voice control device 1001 transmits the voice data to the server 1006. The server 1006 changes only the item of the number of copies instructed to be changed from, for example, "1" to "2". Note that if a change of a print setting is received, the server 1006 may cause the voice control device 1001 to notify the user, by voice command, of the print setting after the change.

The user may be notified of the print setting not by voice command, but by display. That is, the server 1006 may transmit a control command to the display apparatus 1003 and cause the display apparatus 1003 to display a print setting to be applied. This allows the user to easily grasp what kind of print setting is used to do printing. Note that the print setting may be changeable by the user on a screen displayed on the display apparatus 1003. More specifically, the server 1006 holds the data of a print setting screen. The display apparatus 1003 acquires the screen data of the print setting from the server 1006, thereby displaying the print setting screen. This allows the user to do print setting while viewing the screen.

In addition, the items of print setting necessary for the server 1006 to generate print data include a plurality of items, as described above. FIG. 13 shows the items of a print setting. When there are many print setting items, the user may designate only some setting items by voice command. More specifically, only representative setting items may be instructed by uttering, for example, "print one copy of the photo A in the L size". Hence, in this embodiment, it may be confirmed for each necessary print setting item whether the information is included in the voice data, and the value of a predetermined print setting may be applied only for an item that is not included. The procedure of this processing will be described with reference to FIG. 9B.

Figure 9A:
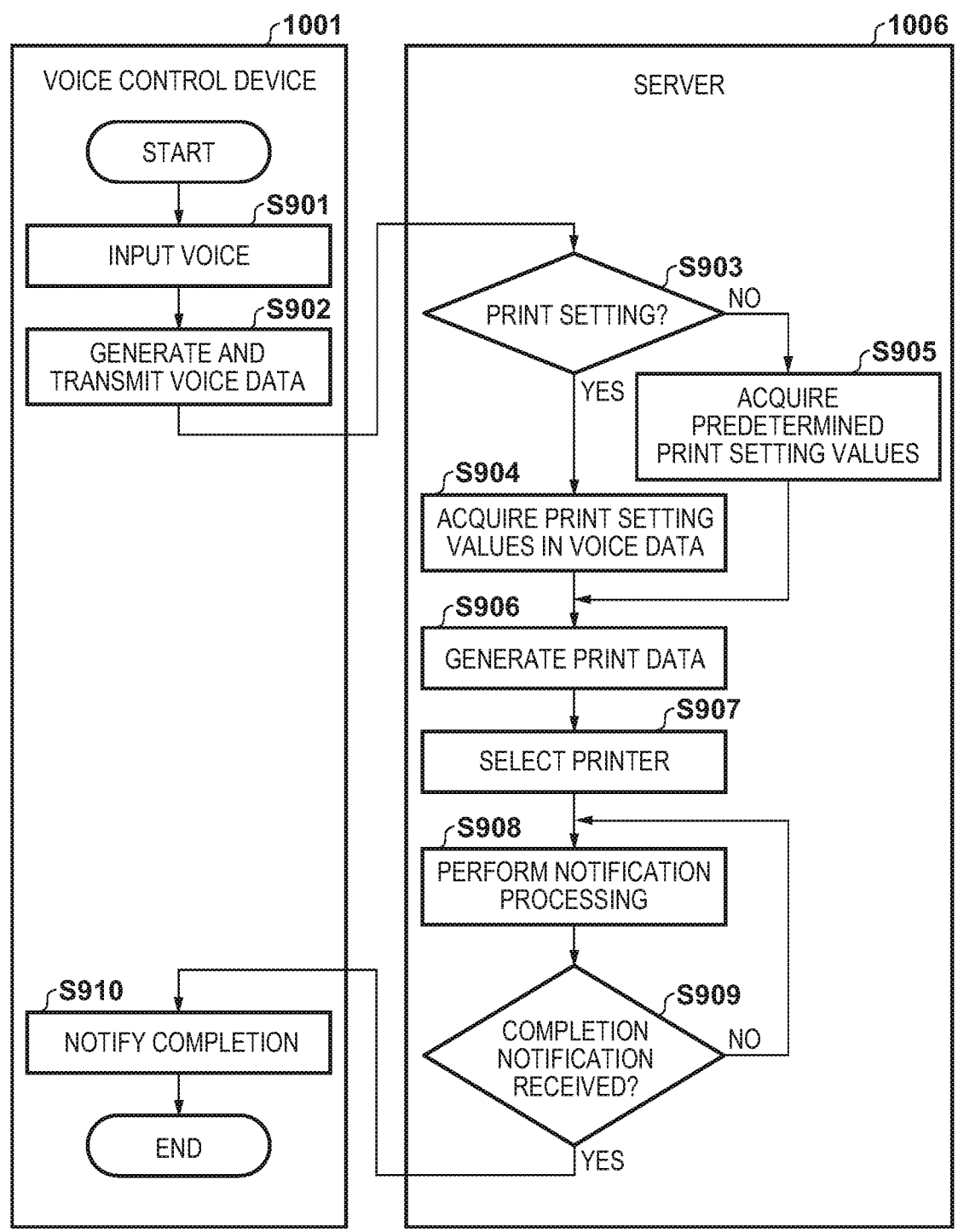
FIGS. 9A and 9B are flowcharts showing the processing of the voice control device and the server.
Figure 9B:
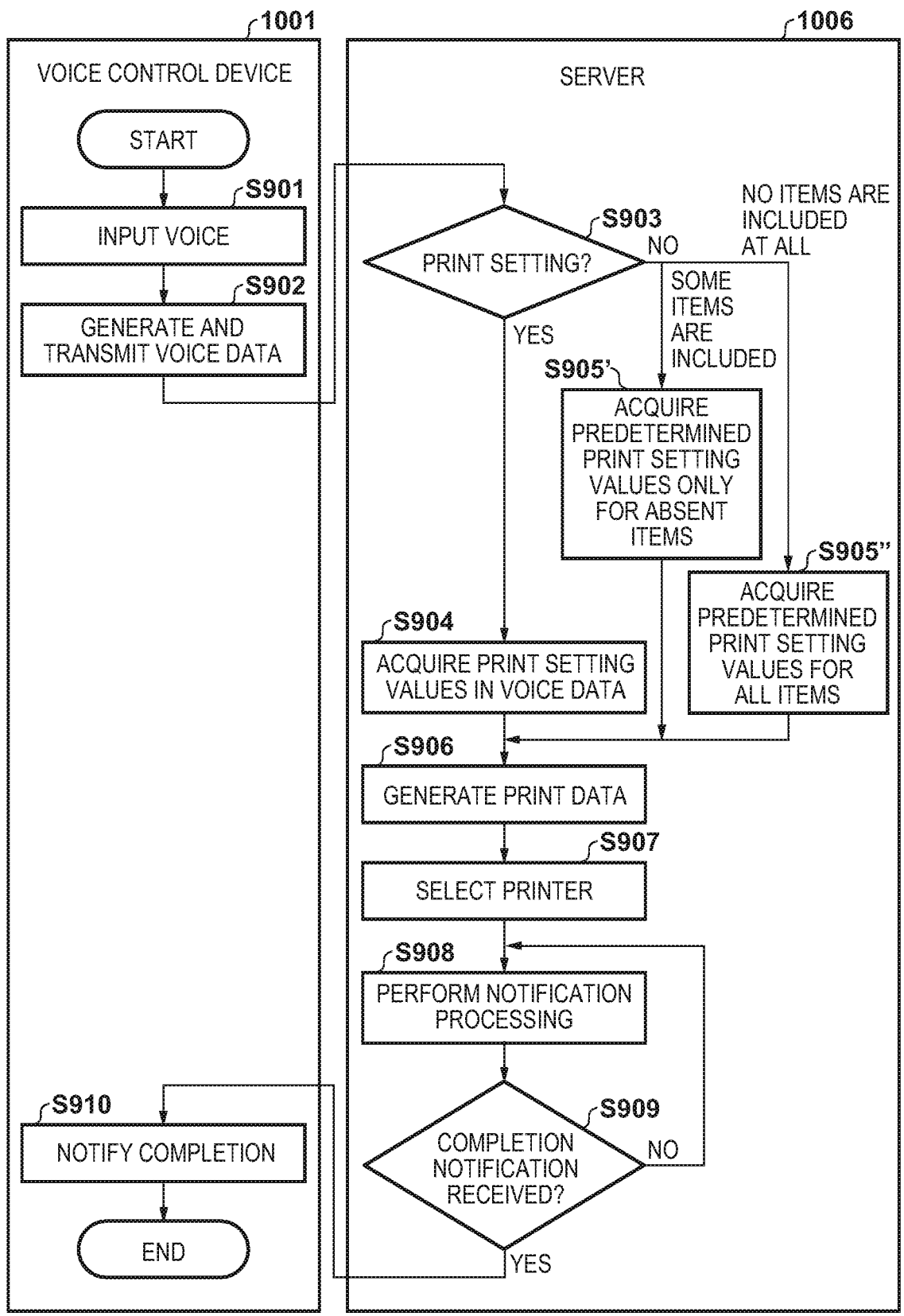

Referring to FIG. 9B, the processes of steps S901 and S902 are the same as in FIG. 9A. In step S903, when determining whether the pieces of information concerning the print setting are included in the voice data, the CPU 801 determines whether all the necessary print setting items are included. That is, print setting items included in the voice data and print setting items that are not included are specified. If all items are included in the voice data, the CPU 801 acquires the pieces of information concerning the print setting in the voice data (step S904), as in FIG. 9A. On the other hand, if some print setting items are not included in the voice data, the CPU 801 acquires predetermined set values registered in advance only for the items (absent items) that are not included and, for the items included in the voice data, acquires the information from the voice data (step S905'). In addition, if the pieces of information concerning the print setting are not included in the voice data at all, the CPU 801 acquires predetermined set values registered in advance for all the items (step S905"). The subsequent processing is the same as in FIG. 9A, and a description thereof will be omitted. With this processing, it is also possible to cope with a case in which the user instructs only some print setting items.

Additionally, as shown in FIG. 14, the server 1006 according to this embodiment may have a plurality of print settings as the predetermined print settings. More specifically, different print settings are preferably provided in accordance with the data type of a print target. For example, a preferable setting or a general setting changes between a photo and a document (a document created by document creation software such as Microsoft Word). Hence, a plurality of print settings that are different depending on the data type are registered in the server 1006. If instructions concerning the print setting are not included in the voice data in step S903, the server 1006 identifies the data type of the print target. The identification can be performed based on, for example, the extension of a data file. Based on the identification result, a print setting corresponding to the identified data type is acquired from the memory of the server 1006. For example, if the data type is "photo", "print setting 1" is selected. If the data type is "document", "print setting 2" is selected.

Furthermore, the server 1006 according to this embodiment may have a plurality of print settings independently of the data type. For example, assume that the user instruct "print a document B on fine art paper" by voice command. In this case, the user is assumed to place importance on fine printing rather than the print speed. A voice command "print setting 2" that is a print setting for a document in FIG. 14, however, defines "print quality: standard", "double-sided/single-sided setting: double-sided setting", and "page layout: 2 pages/sheet". Hence, if the uninstructed print setting items are directly applied, a printing result different from that assumed by the user may be obtained. To prevent this, the server 1006 according to this embodiment has a plurality of print settings, in which at least some items have different pieces of setting information (set values), in correspondence with one data type. In particular, a plurality of print settings in which the print quality, color setting, double-sided/single-sided setting, and the like, are different may be provided in accordance with the paper type. For example, in addition to the print settings 1 and 2 shown in FIG. 14, "print setting 3" in which "paper type: fine art paper", "print quality: fine", "double-sided/single-sided setting: single-sided printing", and "page layout: 1 pages/sheet" are registered is provided as another print setting "for document". When the plurality of print settings are registered in this way, even if the user instructs "print the document B on fine art paper", the server 1006 can select and acquire "print setting 3" having set values corresponding to this. Note that instead of referring to the data type, the print setting may be provided for each paper type simply based on the information of paper type included in the voice instruction. As described above, even if the user instructs only some print setting items, the server 1006 can select a print setting including setting information corresponding to the instruction from a plurality of registered print settings. It is therefore possible to generate print data more according to the user's intention.

Additionally, in this embodiment, the registered values of the "predetermined print setting" may be changeable by a user instruction. The predetermined print setting is determined in accordance with the printing apparatus 1004 or the server 1006 to sign in. A default print setting is registered as an initial setting unless the print setting is changed. To change the default print setting, the user instructs, by voice, the voice control device 1001 to send voice data to the server 1006, and the print setting in the server 1006 is changed. The print setting in the server 1006 may be changed via a terminal apparatus, such as the portable terminal 1002.

In addition, when the voice control device 1001 can specify the name of the user who has requested printing from the voice command "print the photo A displayed on the display apparatus 1003", voice data may be generated by adding the user name. With this processing, for example, the printing apparatus 1004 can display the user name during execution of the print processing 711 or as a print history.

In addition, after the print completion is notified and before printing using other print data is instructed, near the voice control device 1001, the user utters the wake word first and then utters what the user himself/herself wants to do, thereby reflecting the contents. For example, the user utters the wake word and then utters a copy addition instruction, such as "one more copy" or "additionally print three copies".

Upon receiving the copy addition instruction, the voice control device 1001 may transmit the voice data transmitted in the process 707 again. At this time, voice data corresponding to "one more copy" or "additionally print three copies" is also transmitted together. The server 1006 receives the two voice data, thereby performing the same print data generation processing as in the process 708. The server 1006 sets the number of copies based on the voice data of the new request. With this processing, the user can easily instruct re-printing using the same image data. Furthermore, after the print completion is notified and before printing using other print data is instructed, near the voice control device 1001, the user utters the wake word first and then utters what the user himself/herself wants to do, thereby reflecting the contents. For example, the user utters the wake word and then utters "print on a larger sheet". Upon receiving the instruction, the voice control device 1001 may transmit the voice data transmitted in the process 707 again.

At this time, voice data corresponding to "print on a larger sheet" is also transmitted together. The server 1006 receives the two voice data, thereby performing the same print data generation processing as in the process 708. The server 1006 sets the paper size based on the voice data of the new request. With this processing, the user can easily instruct to print the same image data on a sheet of a different size. Note that when another device, for example, the voice control device 1001 or the display apparatus 1003 generates print data, as will be described later, the device that generates print data may perform the same processing.

In addition, if an instruction associated with the print speed is included in the instruction by voice command, the server 1006 may change the print setting to be applied based on the instruction. More specifically, when an instruction "print quickly" is received from the user, the server 1006 determines that printing needs to be completed quickly and changes the setting such that printing is performed in a speed priority mode. More specifically, even if the item of "print quality" in the registered print setting is a set value corresponding to "fine", it is changed to a set value corresponding to "standard".

In addition, the server 1006 may analyze the set values in a print instruction received in the past, thereby reflecting the user's preference concerning the print setting. More specifically, in a case in which the user often used a setting to allocate two pages to one sheet a predetermined number or more of times in a past predetermined period, this setting may be reflected even if the print setting of the page layout registered by default is a setting to allocate one page to one sheet. That is, the registered set value of the item of the page layout is changed to a set value corresponding to "two pages/sheet".

In addition, the printing apparatus 1004 or the server 1006 may include a memory that saves a voice keyword concerning printing. The voice control device 1001 downloads the voice keyword from the printing apparatus 1004 or the server 1006. Since the voice control device 1001 can thus correctly interpret the voice of the user concerning a print instruction to generate voice data, the voice control device 1001 becomes more familiar with terms concerning printing and can execute printing more conforming to the user's intention.

For example, the CPU 407 of the printing apparatus 1004 or the CPU 801 of the server 1006 stores words concerning a print instruction in the ROM 405 or the ROM 802. If a new executable function or item is available in accordance with the upgrading of the firmware of the printing apparatus 1004, the words concerning printing may also be updated. For example, the printing apparatus 1004 newly registers, in the memory, words used anew on a user interface screen, such as a main menu screen or a setting screen corresponding to the new function. At this time, voice information such as a frequency, speed, and intonation may also be stored as standard feature amounts serving as a model together with the words.

Case in which Setting Change of Printing Apparatus is Instructed (Control Example 1)

In this embodiment, a control example in a case in which the setting change of the printing apparatus 1004 is performed using the voice control device 1001 and the display apparatus 1003 will be described below.

Figure 15:
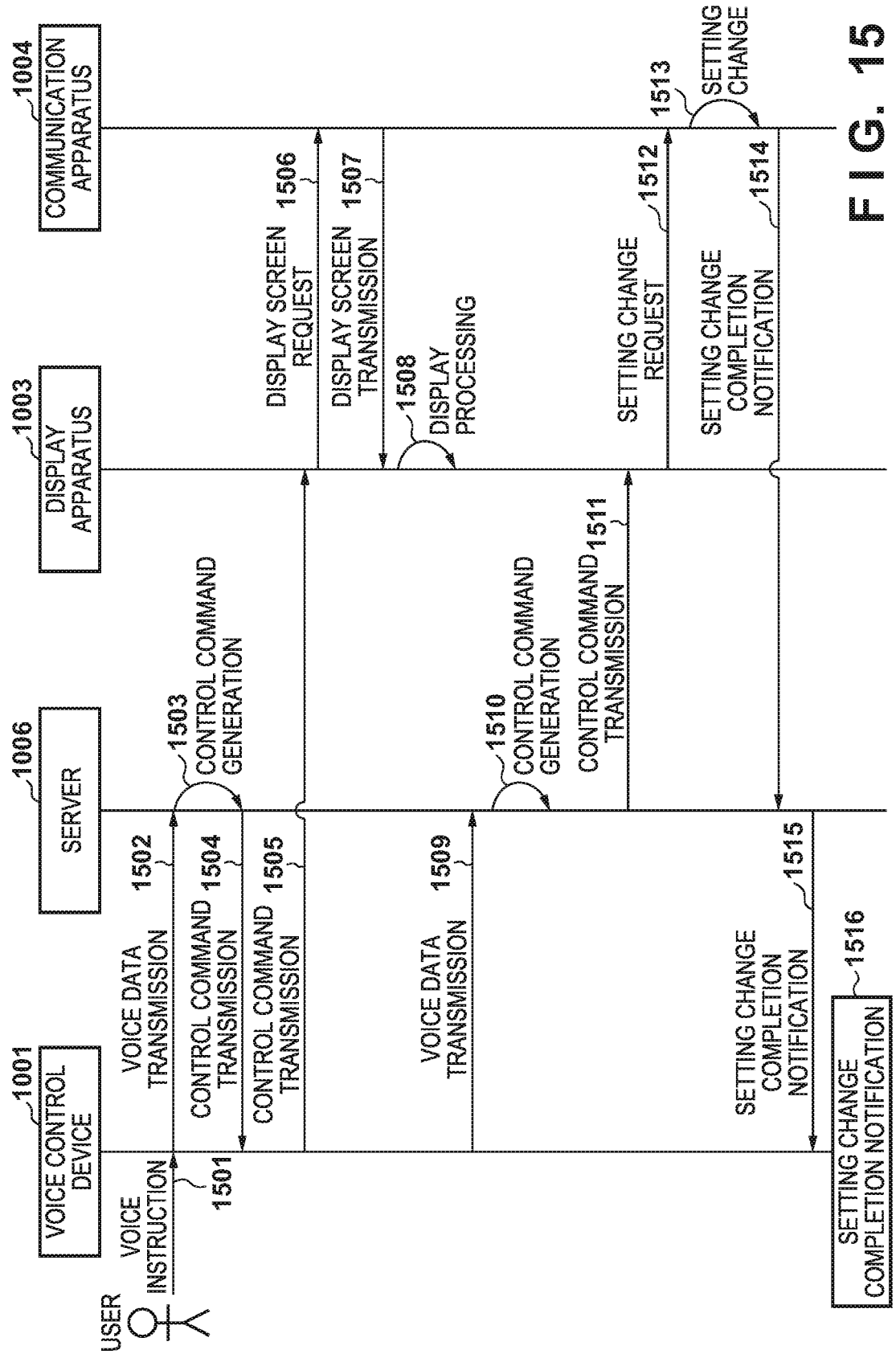
FIG. 15 is a sequence chart showing a sequence in a case in which the voice control device receives a setting change instruction for the printing apparatus.

FIG. 15 is a sequence chart in a case in which the voice control device 1001 receives a setting change instruction for the printing apparatus 1004. Near the voice control device

1001, the user inputs, by voice, a wake word that is a predetermined keyword first and then inputs, by voice command, what the user himself/herself wants to do. For example, the user inputs, by voice command, the wake word and then "power saving setting change" (process 1501). The voice control device 1001 inputs the voice command of the wake word, thereby inputting the voice uttered next. That is, the voice control device 1001 inputs the voice command "power saving setting change".

As a setting-changeable setting of the printing apparatus 1004, there is, for example, a power saving setting for doing a setting associated with the power mode. Examples of the setting items of the power saving setting are an automatic power-on function, an automatic power-off function, and the like. The automatic power-off function is a function of automatically turning off the power for the purpose of suppressing power consumption when a state in which the printing apparatus 1004 is not in use in a power-on state continues for a predetermined period. The automatic power-on function is a function of automatically turning on the power in accordance with reception of, for example, print data by the printing apparatus 1004 in a power-off state. The automatic power-on function is also a function of automatically turning on the power in accordance with an operation of the user on the operation panel. That is, the automatic power-on function is a function of automatically turning on the power even if software-on by the user is not instructed. In this control example, the automatic power-on setting before the setting change of the printing apparatus 1004 is assumed to be in a disabled state. That is, if a state in which the printing apparatus 1004 is not in use continues for a predetermined period, the power of the printing apparatus 1004 is automatically turned off. Here, even if the user transmits print data to the printing apparatus 1004, the printing apparatus 1004 maintains the OFF state if the automatic power-on setting is disabled. In this embodiment, the automatic power-on setting will be described as an example of the setting-changeable setting item of the printing apparatus 1004. The setting item for which a setting change by voice is possible is not, however, limited to the automatic power-on setting. The setting item can be any setting item as long as it can change the setting of the printing apparatus 1004.

The voice control device 1001 transmits the identification information (for example, the Mac address) of the voice control device 1001 and voice data based on the received voice to the server 1006 (process 1502). The server 1006 specifies, from the Mac address of the voice control device 1001, a user ID associated with the Mac address, thereby recognizing that the voice control device 1001 is a device that has already signed in. In addition, the above-described access token may be used. The server 1006 analyzes the voice data transmitted from the voice control device 1001, generates a control command based on the voice data (process 1503), and transmits the control command to the voice control device 1001 (process 1504). Note that the control command includes a display processing command as processing contents to be executed and information representing the storage location of display screen data corresponding to the power saving setting as the display target. Here, the storage location of the display screen data is the printing apparatus 1004.

The voice control device 1001 selects the transmission target of the control command received from the server 1006. Here, since the user inputs, by voice, "power saving setting change" as the request from the user, the voice control device 1001 selects the display apparatus 1003 as the transmission destination to display a setting state and a setting change result. The voice control device 1001 transmits the control command to the selected display apparatus 1003 (process 1505). Note that although the voice control device 1001 transmits the control command received from the server 1006 as a display instruction in the process 1505, another command may be transmitted. That is, the voice control device 1001 may generate another command based on the control command received in the process 1504 and transmit the other generated command as a display instruction to the display apparatus 1003. The process in which the voice control device 1001 transmits a control command is described even the following description (for example, a process 1605 in FIG. 16 and the like). Another command generated based on the control command may be transmitted similarly. In this case, the device that has received the control command can execute processing according to the received control command.

The display apparatus 1003 executes processing according to the control command. The display apparatus 1003 first performs display screen request to acquire display screen data (display data) corresponding to the power saving setting saved in the printing apparatus 1004 (process 1506), which is included in the control command. The printing apparatus 1004 acquires display screen data based on the identification information included in the display screen request (process 1506) and transmits the display screen data to the display apparatus 1003 (process 1507). The display screen data is stored in, for example, the ROM 405 of the printing apparatus 1004. The display apparatus 1003 displays a screen based on the sent display screen data (process 1508).

Figure 17:
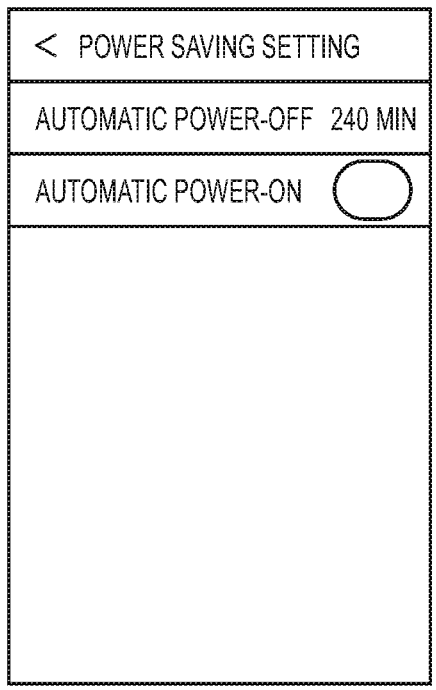
FIG. 17 is a view showing a screen concerning the setting change of the printing apparatus.

FIG. 17 is a view showing an example of a screen concerning the setting change of the printing apparatus 1004, and illustrates that the current automatic power-on setting of the printing apparatus 1004 is in a disabled state. Hence, for example, when a power saving setting screen as shown in FIG. 17 is displayed as a display screen corresponding to the power saving setting in the process 1508 of this control example, the current setting is easy to understand, and the user can easily perform the setting change.

Note that the display apparatus 1003 may have a web browser function, and the printing apparatus 1004 may include a web server. In this case, the display apparatus 1003 designates a URL included in the control command and corresponding to the power saving setting screen and accesses the web server of the printing apparatus 1004, thereby performing the display screen request (process 1506). Then, the display apparatus 1003 may acquire the display screen data of the power saving setting screen from the web server provided in the printing apparatus 1004 (process 1507) and display the screen using the web browser (process 1508).

In a state in which the screen corresponding to the power saving setting change is displayed on the display apparatus 1003, near the voice control device 1001, the user inputs, by voice command, the wake word and then inputs, by voice command, what the user himself/herself wants to do. For example, the user inputs, by voice command, the wake word and then "enable the automatic power-on function of the printing apparatus". The voice control device 1001 receives the voice command of the wake word, thereby receiving the words uttered next. That is, the voice control device 1001 inputs the voice command "enable the automatic power-on function of the printing apparatus", thereby receiving the setting change by voice command.

The voice control device 1001 transmits the voice data to the server 1006 (process 1509). Note that the basic process is the same as the process 1502. The server 1006 analyzes the voice data transmitted from the voice control device 1001, generates a control command based on the voice data (process 1510), and transmits the control command to the display apparatus 1003 (process 1511). Note that the control command includes, as processing contents to be executed, information representing that the automatic power-on function of the printing apparatus 1004 is to be changed to the enabled state.

The display apparatus 1003 executes processing according to the control command. The display apparatus 1003 first sends a setting change request to the printing apparatus 1004 to change the automatic power-on function of the printing apparatus 1004 to the enabled state based on the information included in the control command (process 1512). Additionally, the control command generated in the process 1510 may include a display processing command as processing contents to be executed and information representing the storage location of display screen data corresponding to a state in which the automatic power-on function as the display target is enabled in addition to the above-described information. In this case, a display screen request (not shown) may be sent to the printing apparatus 1004 together with the setting change request (process 1512), display screen data may be acquired, and a screen in which the automatic power-on function is changed to the enabled state may be displayed on the display apparatus 1003. This allows the user to confirm that the setting change is done.

Figure 18:
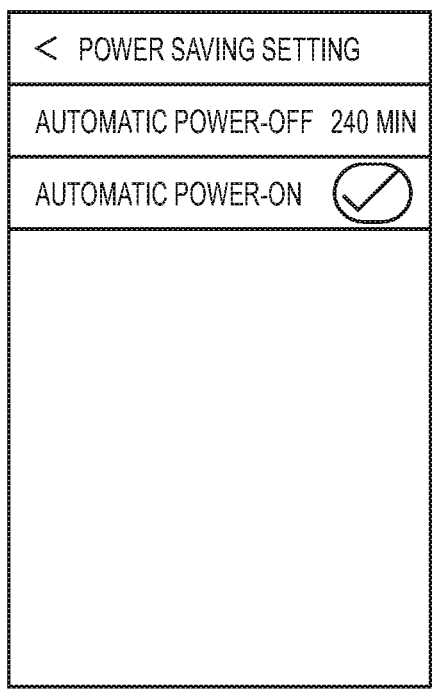
FIG. 18 is a view showing a screen concerning the setting change of the printing apparatus.

FIG. 18 is a view showing an example of a screen concerning the setting change of the printing apparatus 1004, and illustrates that the current automatic power-on setting of the printing apparatus 1004 is in an enabled state. In this embodiment, when a power saving setting screen as shown in FIG. 18 is displayed, the user can easily understand that the setting is changed. The printing apparatus 1004 changes the setting of the automatic power-on function to the enabled state based on the information representing the change contents included in the setting change request (process 1512) (process 1513). When the setting change is completed, the printing apparatus 1004 transmits a setting change completion notification to the server 1006 (process 1514), and the server 1006 transmits the setting change completion notification to the voice control device 1001 (process 1515). Upon receiving the setting change completion notification, the voice control device 1001 notifies the setting change completion by voice (process 1516). Note that by the above-described processing, the display apparatus may be caused, by a voice instruction, to display a screen capable of receiving setting processing for the output apparatus.

Case in Which Setting Change of Printing Apparatus is Instructed (Control Example 2)

In this embodiment, a control example in a case in which the setting change of the printing apparatus 1004 is performed using the voice control device 1001 and the display apparatus 1003 will be described below.

Figure 16:
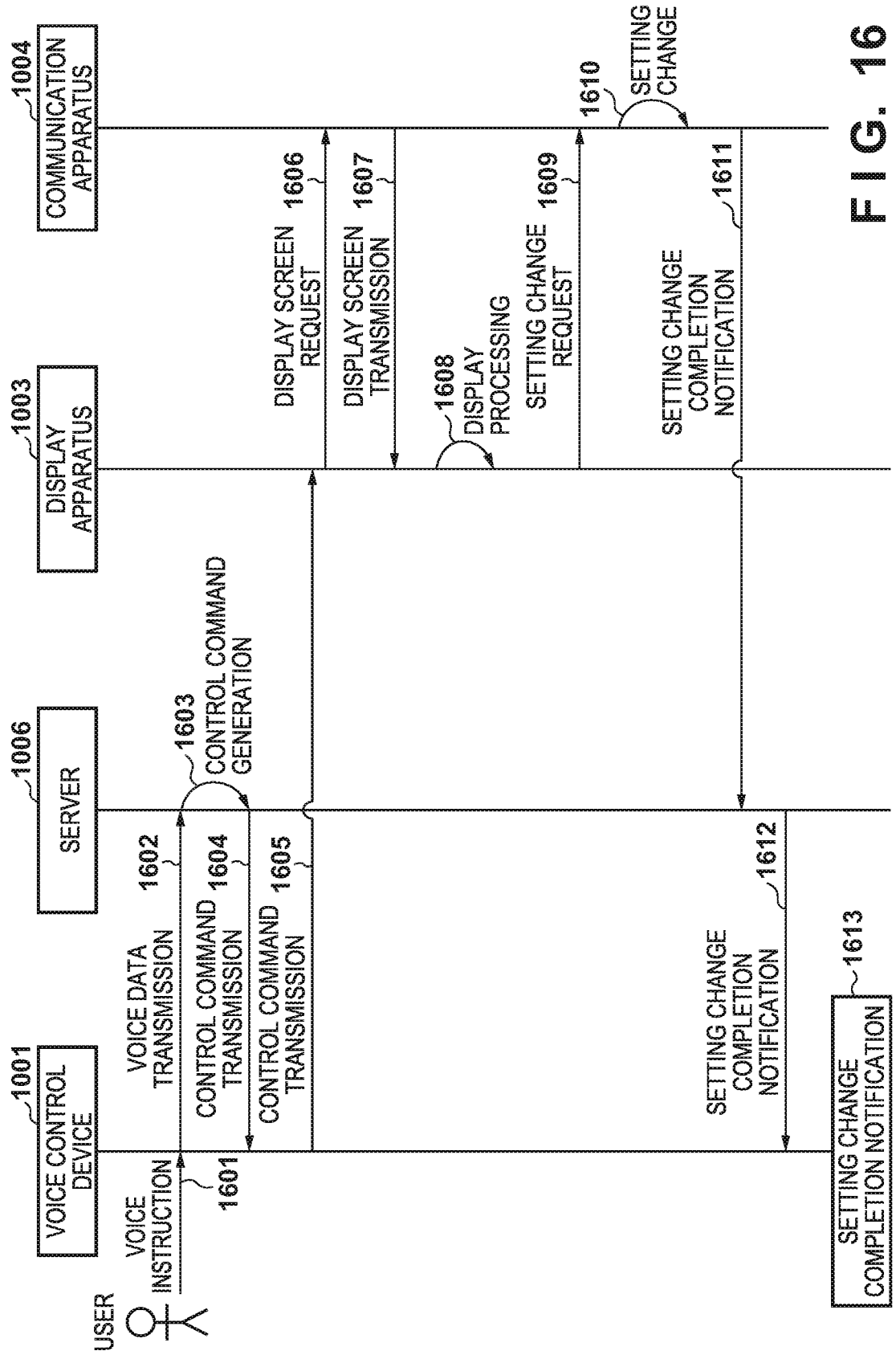
FIG. 16 is a sequence chart showing a sequence in a case in which the voice control device receives a setting change instruction for the printing apparatus.

FIG. 16 is a sequence chart in a case in which the voice control device 1001 receives a setting change instruction for the printing apparatus 1004. Near the voice control device 1001, the user utters a wake word that is a predetermined keyword first and then inputs, by voice command, what the user himself/herself wants to do. For example, the user inputs, by voice command, the wake word and then "enable the automatic power-on function" (process 1601). The voice control device 1001 inputs the voice command of the wake word, thereby inputting the voice uttered next. That is, the voice control device 1001 inputs the voice command "enable the automatic power-on function". Note that in this control example, the automatic power-on setting of the printing apparatus 1004 before the setting change is assumed to be in a disabled state.

The voice control device 1001 transmits the identification information (for example, the Mac address) of the voice control device 1001 and voice data based on the received voice command to the server 1006 (process 1602). The server 1006 specifies, from the Mac address of the voice control device 1001, a user ID associated with the Mac address, thereby recognizing that the voice control device 1001 is a device that has already signed in. In addition, the above-described access token may be used. The server 1006 analyzes the voice data transmitted from the voice control device 1001, generates a control command based on the voice data (process 1603), and transmits the control command to the voice control device 1001 (process 1604). Note that the control command includes, for example, the following commands and information. The first is a setting change command as processing contents to be executed. The second is information representing that the setting change contents represent a change of the automatic power-on function to the enabled state. The third is a display processing command. The fourth is information representing the storage location of display screen data corresponding to the automatic power-on function as the display target. Here, the storage location of the display screen data is the printing apparatus 1004. Hence, the display screen data corresponding to the automatic power-on function is provided by the printing apparatus 1004.

The voice control device 1001 selects the transmission target of the control command received from the server 1006. Here, the user inputs, by voice, "enable the automatic power-on function" as the request from the user. For this reason, the voice control device 1001 selects the display apparatus 1003 as the transmission destination to enable the setting change and setting confirmation even on the display apparatus 1003, and transmits the control command to the selected display apparatus 1003 (process 1605).

In this embodiment, the transmission destination of the control command transmission (process 1605) is the display apparatus 1003. The transmission destination is not, however, limited to the display apparatus 1003. For example, the control command may be transmitted not to the display apparatus 1003 but directly to the printing apparatus 1004. In this case, the printing apparatus 1004 specifies the display apparatus 1003 and the display screen data in the printing apparatus 1004 from the control command and transmits the display screen data to the display apparatus 1003, thereby causing the display apparatus 1003 to display a display screen corresponding to the automatic power-on function. At this time, for example, the screen shown in FIG. 17 described above may be displayed.

The display apparatus 1003 executes processing according to the control command transmitted in the process 1605. The display apparatus 1003 first performs display screen request to acquire a display screen corresponding to the automatic power-on function saved in the printing apparatus 1004 (process 1606), which is included in the control command. Here, the display screen corresponding to the automatic power-on function is, for example, a display screen that expresses the current automatic power-on setting of the printing apparatus 1004, as shown in FIG. 17. The printing apparatus 1004 acquires display screen data based on the identification information included in the display screen request (process 1606) and transmits the display screen data to the display apparatus 1003 (process 1607). The display apparatus 1003 displays a screen based on the sent display screen data (process 1608).

Note that the display apparatus 1003 may have a web browser function, and the printing apparatus 1004 may include a web server. In this case, the display apparatus 1003 designates a URL included in the control command and corresponding to the automatic power-on function, accesses the web server of the printing apparatus 1004, and performs the display screen request (process 1606). Then, the display apparatus 1003 may acquire the display screen data from the web server provided in the printing apparatus 1004 (process 1607) and display the screen using the web browser (process 1608).

Next, the display apparatus 1003 transmits, to the printing apparatus 1004, a setting change request (process 1609) to change the automatic power-on function to the enabled state based on the information included in the control command transmitted in the process 1605. In addition to the above-described information, the control command transmitted in the process 1605 may include a display processing command as processing contents to be executed and information representing the storage location of display screen data corresponding to a state in which the automatic power-on function as the display target is enabled. In this case, a display screen request (not shown) may be sent to the printing apparatus 1004 together with the setting change request (process 1609), display screen data may be acquired, and a screen in which the automatic power-on function is changed to the enabled state may be displayed on the display apparatus 1003. At this time, for example, the screen shown in FIG. 18 described above may be displayed.

The printing apparatus 1004 changes the setting of the automatic power-on function to the enabled state based on the information representing the change contents included in the setting change request (process 1609) (process 1610). When the setting change is completed, the printing apparatus 1004 transmits a setting change completion notification to the server 1006 (process 1611), and the server 1006 transmits the setting change completion notification to the voice control device 1001 (process 1612). Upon receiving the setting change completion notification, the voice control device 1001 notifies the setting change completion by voice command (process 1613).

In FIG. 16, the screen before the change, for example, the screen shown in FIG. 17 is displayed in the process 1608. After the display screen request is received in the process 1606, however, the printing apparatus 1004 may perform the setting change, and transmit the display screen data representing that the automatic power-on function is enabled to the display apparatus 1003 and causes the display apparatus 1003 to display the screen in the process 1607. At this time, for example, the screen shown in FIG. 18 described above may be displayed. In this case, the generated control command (process 1603) needs to include information that specifies the display apparatus 1003 for performing display. Note that in FIG. 16, the screen shown in FIG. 18 is displayed based on the information transmitted from the printing apparatus. The server 1006 may, however, for example, receive a notification concerning setting completion from the printing apparatus. Then, the server 1006 may transmit the information used to display the screen shown in FIG. 18 to the display apparatus and transmit the setting completion notification 1612 to the voice control device 1001. At this time, the display apparatus 1003 displays contents more detailed than the contents notified by voice command by the voice control device. For example, the voice control device may notify only the setting completion by voice command, and the display apparatus 1003 may display a simple voice instruction method of the setting change together with the setting completion.

Case in Which Setting Change of Printing Apparatus is Instructed (Another Control Example)

In control example 2 described above, an example in which the automatic power-on function is enabled in the printing apparatus 1004 whose automatic power-on setting is in the disabled state has been described. Here, for example, a control example in a case in which the user inputs, by voice command, "enable the automatic power-on function of the printing apparatus" in a state in which the automatic power-on function is already in the enabled state will be described. The server 1006 shown in FIG. 16 acquires the setting-changeable setting items and the current set values of the printing apparatus 1004 in advance. Only when the voice instruction (process 1602) that instructs the setting change of the printing apparatus 1004, which is sent from the voice control device 1001, is a change instruction to a setting that is different from the current set values of the printing apparatus 1004, the server 1006 may send the control command (process 1604) to the voice control device 1001. In this case, processing from the process 1604 is not performed. A setting change failure notification (not shown) may be transmitted to the voice control device 1001 to notify, by voice command, that the setting change is not performed. More specifically, upon receiving voice data sent from the voice control device 1001, the server 1006 analyzes the voice data and determines whether the setting of the printing apparatus 1004 stored in advance in the server 1006 is changeable. The server 1006 then controls execution of processing after the process 1604 in accordance with the determination result.

For example, when a voice command including "automatic power-on function" is sent, the server 1006 determines that it is a setting change to the setting-changeable setting of the printing apparatus 1004. Next, since it is a voice instruction "enable the automatic power-on function", the server 1006 compares the setting with the current setting of the printing apparatus 1004, and if the automatic power-on function is already enabled, determines that it is the setting change of the instruction is unnecessary. The server 1006 does not generate the control command and transmits the setting change failure notification (not shown) to the voice control device 1001, thereby notifying, by voice command, that the setting change is not performed.

A method of acquiring the setting-changeable setting items of the printing apparatus 1004 and the current setting-changeable set values of the printing apparatus 1004 by the server 1006 in this embodiment will be described. The setting-changeable setting items of the printing apparatus 1004 may be acquired from the printing apparatus 1004 in advance at the time of sign-in processing of the printing apparatus 1004 to the server 1006 described above and held in the server 1006. Alternatively, the server 1006 may acquire the information by communicating with the printing apparatus 1004 when the information is necessary. In addition, as for the current setting of the setting-changeable setting items of the printing apparatus 1004, for example, the history at the time of reception of the voice instruction of the preceding setting change may be stored. Alternatively, the server 1006 may acquire the information by communicating with the printing apparatus 1004 when the information is necessary.

Note that as an implementation method other than the above-described control examples, the printing apparatus 1004 may determine whether it is an instruction for enabling a setting change. In this case, control to include information, for example, a setting change request (process 1609) including what kind of setting change should be performed in a display screen request (process 1606) shown in FIG. 16 may be performed. For example, assume that upon receiving the display screen request (process 1606), the printing apparatus 1004 refers to the setting change request (process 1609) included in the display screen request (process 1606) and determines that it is a display screen request based on a setting change that is not necessary. In this case, the printing apparatus 1004 returns a reply representing that the display is to be turned off to the display apparatus 1003 in display screen transmission (process 1607) to skip display processing (process 1608). After the setting change (process 1610) is skipped, the printing apparatus 1004 adds failure information to the setting change completion notification (process 1611) and returns it to the server 1006. Upon receiving the failure information added to the setting change completion notification, the voice control device 1001 notifies, by voice command, that the set value has failed (processes 1612 and 1613). The above-described determination to determine whether it is an instruction for enabling a setting change may be performed based on, for example, user authority.

Additionally, as another instruction, a voice instruction "display the screen of the output apparatus" may be used. In this case, for example, the voice control device 1001 transmits, to the display apparatus, a control command including a URL based on the IP address of the printing apparatus 1004 to a URL corresponding to "the screen of the output apparatus". The web browser of the display apparatus 1003 may display a screen provided by the web server of the output apparatus by using the URL.

Second Embodiment

The second embodiment will be described next. In the first embodiment, as described with reference to FIGS. 7, 9A and 9B, a form in which the server 1006 generates print data, and the printing apparatus 1004 performs printing using a notification from the server 1006, which represents that the generation of print data is completed has been described. In this embodiment, a form in which a voice control device 1001 generates print data will be described. Note that a description of portions common to the first embodiment will be omitted, and portions different from the first embodiment will mainly be described below.

FIG. 10 is a sequence chart for explaining print processing. Note that processes 701 to 706 are the same as in FIG. 7, and a detailed description thereof will be omitted. Additionally, in FIGS. 10 and 11, the voice control device 1001 generates print data. Hence, in this embodiment, an external storage device 107 of the voice control device 1001 stores print software that generates print data interpretable by a printing apparatus 1004, information necessary for communication, and the like.

The voice control device 1001 receives the voice command of a wake word, thereby receiving a word uttered next. That is, the voice control device 1001 receives a voice command "print a photo A displayed on a display apparatus 1003".

The voice control device 1001 transmits the voice data to a server 1006 (process 10001). The server 1006 analyzes the voice data transmitted from the voice control device 1001 and executes processing based on the voice data. The server 1006 receives the voice data of the voice command "print the photo A displayed on the display apparatus 1003". For this reason, the server 1006 generates a control command to print image data corresponding to the photo A (process 10002).

The server 1006 transmits the control command generated in the process 10002 to the voice control device 1001 (process 10003). The voice control device 1001 executes processing according to the control command. Since an instruction to acquire and print image data corresponding to the photo A is included in the control command, the voice control device 1001 acquires the image data corresponding to the photo A from the server 1006 (process 10004).

The voice control device 1001 generates print data based on the acquired image data and print setting information (process 10005). Note that as in the first embodiment, if the print instruction from the user is a simple instruction "print the photo A displayed on the display apparatus 1003", pieces of information concerning a print setting are not included. Hence, in this embodiment as well, if the pieces of information concerning a print setting are not included in the instruction by voice, a predetermined print setting is used as the print setting of the image, as in the first embodiment. More specifically, if the pieces of information concerning the print setting are not included in the control command, the voice control device 1001 generates print data by applying a predetermined print setting registered in advance in the voice control device 1001. Note that whether the pieces of information concerning the print setting are included may be determined not by the voice control device 1001 but by the server 1006. In this case, the server 1006 determines whether the pieces of information concerning the print setting are included in the voice data from the voice control device 1001. If the pieces of information concerning the print setting are not included, a control command is generated by applying a predetermined print setting registered in advance in the server 1006. The voice control device 1001 can generate print data based on the print setting included in the control command.

The voice control device 1001 transmits the print data generated in the process 10005 to the printing apparatus 1004 (process 10006). When print processing based on the print data is completed (process 10007), the printing apparatus 1004 transmits a print completion notification to the voice control device 1001 (process 10008). Upon receiving the print completion notification, the voice control device 1001 notifies the print completion by voice command (process 10009).

Details of Processing of Voice Control Device 1001

Processing of the voice control device 1001 will be described next with reference to FIG. 11. The flowchart of FIG. 11 corresponds to the processes 10001 to 10009 in FIG. 10. Note that steps S1101 and S1102 shown in FIG. 11 are the same processes as steps S901 and S902 in FIGS. 9A and 9B, and a detailed description thereof will be omitted.

A CPU 103 receives a control command from the server 1006 (step S1103). The CPU 103 analyzes the received control command and specifies processing to be executed next. The control command includes an instruction to acquire the image data of the photo A and a print instruction of the image data. Hence, the CPU 103 acquires the image data from the server 1006 and generates print data (step S1104). Note that in step S1104, as in the processing of the server 1006 in the first embodiment, it is determined whether pieces of information concerning a print setting are included in the instruction by voice from the user. If the pieces of information are not included, processing of applying a predetermined print setting is performed. More specifically, the CPU 103 analyzes the control command and determines whether the pieces of information concerning the print setting are included in the control command. If the pieces of information concerning the print setting are included in the control command, the CPU 103 acquires the pieces of information concerning the print setting included in the control command. On the other hand, if the pieces of information concerning the print setting are not included in the control command, the CPU 103 acquires pieces of information concerning a predetermined print setting. Here, as the pieces of information concerning the predetermined print setting, pieces of information (values) concerning a print setting registered in advance in the voice control device 1001 are acquired. Then, print data is generated by applying the acquired pieces of information concerning the print setting.

Note that whether the pieces of information concerning the print setting are included may be determined not by the voice control device 1001, but by the server 1006. In this case, the server 1006 determines whether the pieces of information concerning the print setting are included in the voice data from the voice control device 1001. If the pieces of information concerning the print setting are not included, a control command is generated by applying a predetermined print setting registered in advance in the server 1006. Hence, the voice control device 1001 can generate print data based on the print setting included in the control command.

The CPU 103 transmits the print data to the printing apparatus 1004 (step S1105). Here, the CPU 103 registers the display apparatus 1003 and the printing apparatus 1004 as the control target devices of the voice control device 1001 in accordance with an instruction input via a screen 507 shown in FIG. 5 described above. Hence, the CPU 103 decides the transmission destination of the print data to the printing apparatus 1004 in accordance with the registration. The CPU 103 determines whether a print completion notification is received (step S1106) and, upon receiving the print completion notification, notifies the print completion by voice (step S1107).

With the above-described processing, the user can print a desired photo by a simple operation. In addition, the load on the server 1006 can be reduced.

Note that in the above-described example, pieces of information concerning a predetermined print setting are registered in the voice control device 1001 has been described. The server 1006 may, however, hold the pieces of information concerning the predetermined print setting. That is, the server 1006 determines whether pieces of information concerning a print setting are included in the voice data from the voice control device 1001 in the process 10001. Upon determining that the pieces of information concerning a print setting are not included in the voice data, the server 1006 includes, in the control command, pieces of information concerning a predetermined print setting registered in advance in the server 1006. Then, the server 1006 transmits the control command to the voice control device 1001. The voice control device 1001 generates print data in accordance with the received control command.

Additionally, in this embodiment as well, when the voice control device 1001 executes the processing associated with the print setting described in the Modification section, below, as a modification of the first embodiment, by replacing the server 1006, the same processing as in each example of the Modification of the first embodiment can be executed. Even in a modification, a description of the same processes as in the first embodiment will be omitted, and portions different from the first embodiment will mainly be described below.

In this embodiment as well, if the pieces of information concerning the print setting are not included in the print instruction by voice, the user may be notified by voice that printing is performed using a predetermined print setting. More specifically, if the voice control device 1001 determines that the pieces of information concerning the print setting are not included in the print instruction by the voice of the user or the control command, the voice control device 1001 notifies the user by voice that printing is performed using a predetermined print setting. The server 1006 may determine whether the pieces of information concerning the print setting are included in the voice data and generate and transmit a control command to cause the voice control device 1001 to notify the user by voice that printing is performed using a predetermined print setting, as a matter of course. In addition, the user may be notified by a question-type voice, or the print setting may be determined or changed by receiving a reply from the user to the question, as in the first embodiment. Additionally, in this embodiment as well, the user may be notified of the print setting not by a voice command, but by display. More specifically, a control command may be transmitted from the voice control device 1001 or the server 1006 to the display apparatus 1003, and the display apparatus 1003 may display the print setting to be applied.

In addition, the voice control device 1001 or the server 1006 may confirm whether information is included in the instruction for each necessary item of the print setting. That is, the voice control device 1001 may generate print data by applying the value of a predetermined print setting registered in advance in the voice control device 1001 or the server 1006 for an item that is not included in the voice command. Additionally, as shown in FIG. 14, the voice control device 1001 or the server 1006 may have a plurality of print settings. A predetermined print setting is selected from them based on the print instruction. In addition, a plurality of print settings may be provided for one data type. Furthermore, the predetermined print setting may be changeable by an instruction of the user.

In addition, when the voice control device 1001 can specify the name of the user who has requested printing from the voice command "print the photo A displayed on the display apparatus 1003", voice data may be generated by adding the user name.

In addition, after the print completion is notified and before printing using other print data is instructed, the user inputs a copy addition instruction by voice command, thereby enabling execution of re-printing using the same image data for the added copies. In addition, after the print completion is notified and before printing using other print data is instructed, the user may instruct a different print setting by voice command, thereby enabling execution of re-printing of the different print setting using the same image data.

In addition, if an instruction associated with the print speed is included in the instruction by voice command, the voice control device 1001 or the server 1006 may change the print setting to be applied based on the instruction. Furthermore, the voice control device 1001 or the server 1006 may analyze, for example, the set values in a print instruction received in the past predetermined period, thereby reflecting the user's preference concerning the print setting. That is, the registered value of a predetermined print setting may be changed based on the analysis result concerning the preference.

Note that in the system according to the second embodiment as well, the setting of the printing apparatus 1004 may be changed, as described with reference to FIGS. 15 and 16 in the first embodiment. That is, the voice control device 1001 may change the setting of the printing apparatus 1004 by receiving a setting change instruction for the printing apparatus 1004 by the voice command of the user.

Third Embodiment

The third embodiment will be described next. In this embodiment, a form in which a display apparatus 1003 generates print data will be described. Note that a description of portions common to the first embodiment will be omitted, and portions different from the first embodiment will mainly be described below.

FIG. 12 is a sequence chart for explaining print processing. Note that processes 701 to 706 are the same as in FIG. 7, and a detailed description thereof will be omitted. Additionally, processes 1201 to 1203 are the same as the processes 10001 to 10003 in FIG. 10, processes 1207 to 1209 are the same processes as the processes 10007 to 10009 in FIG. 10, and a detailed description thereof will be omitted. In the processing shown in FIG. 12, the display apparatus 1003 generates print data. Hence, an external storage device 207 of the display apparatus 1003 stores print software that generates print data interpretable by a printing apparatus 1004, information necessary for communication, and the like.

A voice control device 1001 executes processing according to a control command. Here, an instruction to acquire and print image data corresponding to a photo A is included in the control command. In FIG. 12, the display apparatus 1003 generates print data. Hence, the voice control device 1001 transmits the control command to the display apparatus 1003 (process 1204).

The display apparatus 1003 executes processing according to the received control command. Since the image data is already acquired for display, the display apparatus 1003 generates print data based on the already acquired image data (process 1205). Note that as in the first and second embodiments, if the print instruction from the user is a simple instruction "print the photo A displayed on the display apparatus 1003", pieces of information concerning a print setting are not included. Hence, in this embodiment as well, if the pieces of information concerning a print setting are not included in the instruction by voice command, a predetermined print setting is used as the print setting of the image, as in the first and second embodiments.

More specifically, the display apparatus 1003 generates print data by applying a predetermined print setting registered in advance in the display apparatus 1003. Note that a CPU 203 of the display apparatus 1003 analyzes the control command and determines whether pieces of information concerning a print setting are included in the control command. If the pieces of information are included in the control command, the CPU 203 of the display apparatus 1003 acquires the pieces of information concerning the print setting included in the control command. On the other hand, if the pieces of information concerning the print setting are not included in the control command, the CPU 203 of the display apparatus 1003 acquires pieces of information concerning a predetermined print setting. Here, as the pieces of information concerning the predetermined print setting, pieces of information (values) concerning a print setting registered in advance in the display apparatus 1003 are acquired. Then, print data is generated by applying the acquired pieces of information concerning the print setting.

At this time, the display apparatus 1003 may display the pieces of information concerning the print setting. Note that whether the pieces of information concerning the print setting are included may be determined not by the display apparatus 1003 but by the server 1006 or the voice control device 1001. When the server 1006 performs the determination, the server 1006 determines whether the pieces of information concerning the print setting are included in the voice data from the voice control device 1001. If the pieces of information concerning the print setting are not included, a control command is generated by applying a predetermined print setting registered in advance in the server 1006. Hence, the display apparatus 1003 can generate print data based on the print setting included in the control command.

When the voice control device 1001 performs the determination, the voice control device 1001 analyzes the received voice command or the control command acquired in the process 1203 and determines whether the pieces of information concerning the print setting are included. If the pieces of information concerning the print setting are not included, a control command is generated by applying a predetermined print setting registered in advance in the voice control device 1001. Accordingly, the display apparatus 1003 can generate print data based on the print setting included in the control command. The display apparatus 1003 transmits the print data generated in the process 1205 to the printing apparatus 1004 (process 1206).

With the above-described processing, the user can print a desired photo by a simple operation. In addition, the load on the server 1006 and the voice control device 1001 can be reduced.

Note that in the above-described example, pieces of information concerning a predetermined print setting are registered in the display apparatus 1003 has been described. The server 1006 may, however, hold the pieces of information concerning the predetermined print setting. That is, the server 1006 determines whether pieces of information concerning a print setting are included in the voice data from the voice control device 1001 in the process 1201. Upon determining that the pieces of information concerning a print setting are not included in the voice data, the server 1006 generates a control command including pieces of information concerning a predetermined print setting registered in advance in the server 1006. Then, the server 1006 transmits the control command to the display apparatus 1003 directly or via the voice control device 1001. The display apparatus 1003 generates print data in accordance with the received control command.

Additionally, in this embodiment as well, when the display apparatus 1003 executes the processing associated with the print setting described in the Modification of the first embodiment by replacing the server 1006, the same processing as in each example of the Modification of the first embodiment can be executed.

Even in a modification, a description of the same processes as in the first embodiment will be omitted, and portions different from the first embodiment will mainly be described below.

In this embodiment as well, if the pieces of information concerning the print setting are not included in the voice data, the user may be notified by voice command that printing is performed using a predetermined print setting.

More specifically, if the display apparatus 1003 determines that the pieces of information concerning the print setting are not included in the print instruction by the voice command of the user, the voice control device 1001 notifies the user by voice command that printing is performed using a predetermined print setting. One of the voice control device 1001 and the server 1006 may determine whether the pieces of information concerning the print setting are included, as a matter of course. In addition, the user may be notified by a question-type voice, or the print setting may be determined or changed by receiving a reply from the user to the question, as in the first embodiment. Additionally, in this embodiment as well, the user may be notified of the set values not by a voice command, but by display. More specifically, a control command may be transmitted from the voice control device 1001 or the server 1006 to the display apparatus 1003, and the display apparatus 1003 may display the print setting to be applied.

In addition, one of the display apparatus 1003, the voice control device 1001, and the server 1006 may confirm whether information is included in the instruction for each necessary item of the print setting. The display apparatus 1003 can generate print data by applying the value of a predetermined print setting registered in advance in one of the display apparatus 1003, the voice control device 1001, and the server 1006 for an item that is not included in the voice command.

Additionally, as shown in FIG. 14, a plurality of print settings may be provided. A predetermined print setting is selected from them based on the print instruction. In addition, a plurality of print settings may be provided for one data type. Furthermore, the predetermined print setting may be changeable by an instruction of the user.

In addition, when the voice control device 1001 can specify the name of the user who has requested printing from the voice command "print the photo A displayed on the display apparatus 1003", voice data may be generated by adding the user name.

In addition, after the print completion is notified and before printing using other print data is instructed, the user inputs a copy addition instruction by voice command, thereby enabling execution of re-printing using the same image data for the added copies. In addition, after the print completion is notified and before printing using other print data is instructed, the user may instruct a different print setting by voice command, thereby enabling execution of re-printing of the different print setting using the same image data.

In addition, if an instruction associated with the print speed is included in the instruction by voice command, one of the display apparatus 1003, the server 1006, and the voice control device 1001 may change the print setting to be applied based on the instruction. Furthermore, one of the display apparatus 1003, the server 1006, and the voice control device 1001 may analyze, for example, the set values in a print instruction received in the past predetermined period, thereby reflecting the user's preference concerning the print setting. That is, the registered value of a predetermined print setting may be changed based on the analysis result concerning the preference.

Note that in the system according to the third embodiment as well, the setting of the printing apparatus 1004 may be changed, as described with reference to FIGS. 15 and 16 in the first embodiment. That is, the voice control device 1001 may change the setting of the printing apparatus 1004 by receiving a setting change instruction for the printing apparatus 1004 by the voice of the user.

OTHER EMBODIMENTS

In the above-described embodiments, a form in which a photo displayed on the display apparatus 1003 is printed has been described. Printing may, however, be instructed in another form.

For example, the user utters "print a file A" next to the wake word. The voice control device 1001 transmits voice data corresponding to the voice command "print a file A" to the server 1006. Then, the server 1006 may search data managed for the user for data with a name "file A" and generate print data. Additionally, in the above-described embodiments, a case in which image data corresponding to the photo is printed has been described. The data of the print target is not, however, limited to image data and may be document data.

Furthermore, in the above-described embodiments, a form in which the printing apparatus 1004 performs printing in accordance with the print instruction of the voice uttered by the user has been described. The printing apparatus 1004 may, however, execute print processing based on print data generated by an instruction other than a voice command for print software (for example, a printer driver) installed in the personal computer. Note that the instruction other than a voice command is an instruction input by an operation using a pointing device or an operation using a touch panel.

Additionally, in the above-described embodiments, Bluetooth® has been described as an example of short-distance wireless communication. Another communication method may, however, be used. For example, WiFiAware may be used in place of Bluetooth®.

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A print control system including a printing apparatus and a server system, the print control system comprising:
(A) a memory that stores instructions; and
(B) at least one processor that executes the instructions to cause the print control system to function as:
(a) a reception unit configured to receive a registration request of the printing apparatus;
(b) a registration unit configured to register the printing apparatus based on the received registration request;
(c) a transmission unit configured to transmit, based on receipt of an instruction for the printing apparatus by voice for a voice control device, to the registered printing apparatus, a change instruction for changing a setting of power of the registered printing apparatus; and
(d) a setting processing unit configured to perform setting processing concerning the setting of power based on the transmitted change instruction,
wherein the change instruction concerning an automatic power-on function, as the change instruction for changing the setting of power of the registered printing apparatus, is transmitted, and
wherein the automatic power-on function is a function of automatically turning on power in accordance with receipt of print data.

2. The print control system according to claim 1, wherein, based on receipt of a print instruction by voice in the voice control device, print data based on the print instruction is transmitted to the printing apparatus.

3. The print control system according to claim 1, wherein the voice control device is connected to an access point by one of (i) first reception processing of receiving information concerning the access point by wireless communication via an internal access point provided in the voice control device, and (ii) second reception processing of receiving the information concerning the access point via short-distance wireless communication with a communication speed that is less than that of the wireless communication.

4. A method of controlling a server system, the method comprising:
receiving a registration request of a printing apparatus;
registering the printing apparatus based on the received registration request;
transmitting, based on receipt of an instruction for the printing apparatus by voice for a voice control device, to the registered printing apparatus, a change instruction for changing a setting of power of the registered printing apparatus,
wherein setting processing concerning the setting of power based on the transmitted change instruction is performed by the registered printing apparatus,
wherein the change instruction concerning an automatic power-on function, as the change instruction for changing the setting of power of the printing apparatus, is transmitted, and
wherein the automatic power-on function is a function of automatically turning on power in accordance with receipt of print data.

5. The method according to claim 4, wherein, based on receipt of a print instruction by voice in the voice control device, print data based on the print instruction is transmitted to the printing apparatus.

6. The method according to claim 4, wherein the voice control device is connected to an access point by one of (i) first reception processing of receiving information concerning the access point by wireless communication via an internal access point provided in the voice control device, and (ii) second reception processing of receiving the information concerning the access point via short-distance wireless communication with a communication speed that is less than that of the wireless communication.

7. The print control system according to claim 1, wherein the server system receives the registration request, registers the printing apparatus based on the received registration request, and transmits, to the registered printing apparatus, the change instruction for changing the setting of power of the registered printing apparatus, and
wherein the printing apparatus performs the setting processing concerning the setting of power based on the transmitted change instruction.

8. The print control system according to claim 1, wherein the at least one processor further causes the print control system to function as (e) a display control unit configured to cause a device, different from the voice control device, to display the setting of power of the registered printing apparatus.

9. The print control system according to claim 1, wherein the voice control device and the printing apparatus are connected to each other via an access point.

10. The print control system according to claim 1, wherein the server system is connected to the printing apparatus via the Internet.

11. The method according to claim 4, wherein the server system receives the registration request, registers the printing apparatus based on the received registration request, and transmits, to the registered printing apparatus, the change instruction for changing the setting of power of the registered printing apparatus, and
wherein the printing apparatus performs the setting processing concerning the setting of power based on the transmitted change instruction.

12. The method according to claim 4, further comprising causing a device, different from the voice control device, to display the setting of power of the registered printing apparatus.

13. The method according to claim 4, wherein the voice control device and the printing apparatus are connected to each other via an access point.

14. The method according to claim 4, wherein the server system is connected to the printing apparatus via the Internet.

15. The print control system according to claim 1, wherein the automatic power-on function is the function of automatically turning on power in accordance with receipt of print data by the registered printing apparatus in a power-off status.

16. The method according to claim 4, wherein the automatic power-on function is the function of automatically turning on power in accordance with receipt of print data by the registered printing apparatus in a power-off status.

* * * * *